US009696431B2

(12) United States Patent
Wirola

(10) Patent No.: US 9,696,431 B2
(45) Date of Patent: Jul. 4, 2017

(54) SELECTION OF A RELATIVE POSITIONING METHOD

(75) Inventor: Lauri Wirola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/640,701

(22) PCT Filed: Apr. 12, 2010

(86) PCT No.: PCT/IB2010/051561
§ 371 (c)(1),
(2), (4) Date: Oct. 11, 2012

(87) PCT Pub. No.: WO2011/128722
PCT Pub. Date: Oct. 20, 2011

(65) Prior Publication Data
US 2013/0030684 A1    Jan. 31, 2013

(51) Int. Cl.
*G06F 17/00* (2006.01)
*G01S 19/00* (2010.01)
(Continued)

(52) U.S. Cl.
CPC ............ *G01S 19/51* (2013.01); *G01S 5/0289* (2013.01); *G01S 19/43* (2013.01); *G01S 19/48* (2013.01); *G01S 19/258* (2013.01)

(58) Field of Classification Search
USPC ........................................................ 701/300
See application file for complete search history.

(56) References Cited

U.S. PATENT DOCUMENTS 6,128,501 A * 10/2000 Ffoulkes-Jones .......... 455/456.3
7,031,725 B2 * 4/2006 Rorabaugh ................ 455/456.1
(Continued)

FOREIGN PATENT DOCUMENTS

CN    101048671    10/2007
EP    1418439    5/2004
(Continued)

OTHER PUBLICATIONS

Liu, Hui et al "Survey of Wireless Indoor Positioning Techniques and Systems", IEEE Trans. on Systems, Man Cybernetics, vol. 37, No. 6, Nov. 2007, pp. 1067-1081.*
(Continued)

*Primary Examiner* — Fadey Jabr
*Assistant Examiner* — Kevin P Mahne
(74) *Attorney, Agent, or Firm* — Locke Lord LLP

(57) ABSTRACT

It is disclosed to select a relative positioning method from a set of at least two different relative positioning methods that are for determining an estimate of a relative position between first and second entities. The method is selected in dependence on at least one of the following criteria: an estimated/measured distance between the first and second entities; a relative positioning capability, of at least one of the first entity, the second entity and at least one server entity associated with at least one of the first and second entities, to determine an estimate of a relative position between two entities; and an availability, at at least one of the at least one server entity, of a service providing data of at least one reference entity useable for determining an estimate of a relative position between the reference entity and one of the first and second entities.

21 Claims, 11 Drawing Sheets

(51) Int. Cl.
    *G01S 19/51*      (2010.01)
    *G01S 5/02*      (2010.01)
    *G01S 19/43*      (2010.01)
    *G01S 19/48*      (2010.01)
    *G01S 19/25*      (2010.01)

(56) References Cited

U.S. PATENT DOCUMENTS

| | | | |
|---|---|---|---|
| 7,084,809 B2* | 8/2006 | Hockley et al. | 342/357.48 |
| 7,353,031 B2* | 4/2008 | Shi et al. | 455/456.1 |
| 7,440,762 B2* | 10/2008 | Maloney et al. | 455/456.1 |
| 7,730,216 B1* | 6/2010 | Issa et al. | 709/250 |
| 7,742,774 B2* | 6/2010 | Oh et al. | 455/456.1 |
| 7,769,396 B2* | 8/2010 | Alizadeh-Shabdiz et al. | 455/456.6 |
| 7,869,811 B2* | 1/2011 | Wirola et al. | 455/456.1 |
| 7,899,472 B1* | 3/2011 | Wang | 455/456.5 |
| 8,056,860 B2* | 11/2011 | Small et al. | 244/135 A |
| 8,060,017 B2* | 11/2011 | Schlicht et al. | 455/41.2 |
| 8,060,582 B2* | 11/2011 | Bliss et al. | 709/218 |
| 8,085,194 B2* | 12/2011 | Abraham et al. | 342/357.42 |
| 8,117,550 B1* | 2/2012 | Izdepski et al. | 715/753 |
| 8,134,497 B2* | 3/2012 | Janky et al. | 342/357.24 |
| 8,265,650 B2* | 9/2012 | Emond | 455/456.1 |
| 8,355,711 B2* | 1/2013 | Heins et al. | 455/419 |
| 8,386,620 B2* | 2/2013 | Chatterjee | 709/228 |
| 8,588,803 B2* | 11/2013 | Hakola et al. | 455/452.2 |
| 8,612,172 B2* | 12/2013 | Wirola | G01O 5/06 702/144 |
| 8,638,256 B2* | 1/2014 | Alizadeh-Shabdiz et al. | 342/357.31 |
| 8,655,385 B2* | 2/2014 | Li | 455/456.3 |
| 8,660,576 B2* | 2/2014 | Huang | 455/456.1 |
| 8,761,099 B2* | 6/2014 | Charbit et al. | 370/329 |
| 8,812,013 B2* | 8/2014 | Agarwal et al. | 455/456.1 |
| 8,886,253 B2* | 11/2014 | Parssinen et al. | 455/552.1 |
| 8,898,567 B2* | 11/2014 | Arrasvuori et al. | 715/723 |
| 2003/0130793 A1 | 7/2003 | Patwari et al. | |
| 2003/0197645 A1 | 10/2003 | Ninomiya et al. | 342/464 |
| 2004/0008138 A1 | 1/2004 | Hockley et al. | 342/357.09 |
| 2004/0033808 A1* | 2/2004 | Rorabaugh | 455/456.1 |
| 2006/0281470 A1* | 12/2006 | Shi et al. | 455/456.2 |
| 2007/0182547 A1 | 8/2007 | Wachter et al. | |
| 2007/0281716 A1* | 12/2007 | Altman et al. | 455/466 |
| 2008/0248809 A1* | 10/2008 | Gower | 455/456.1 |
| 2008/0280625 A1* | 11/2008 | Larsen | 455/456.1 |
| 2008/0309550 A1* | 12/2008 | Sairo et al. | 342/357.1 |
| 2009/0121939 A1* | 5/2009 | Kim et al. | 342/450 |
| 2009/0219209 A1* | 9/2009 | Bush et al. | 342/450 |
| 2009/0303114 A1* | 12/2009 | Alizadeh-Shabdiz | 342/357.02 |
| 2009/0325607 A1* | 12/2009 | Conway et al. | 455/456.3 |
| 2009/0325625 A1* | 12/2009 | Hugl et al. | 455/522 |
| 2010/0009696 A1* | 1/2010 | Fok et al. | 455/456.1 |
| 2010/0049469 A1* | 2/2010 | Wirola et al. | 702/150 |
| 2010/0073229 A1* | 3/2010 | Pattabiraman et al. | 342/357.09 |

FOREIGN PATENT DOCUMENTS

| | | |
|---|---|---|
| EP | 1881340 | 1/2008 |
| EP | 2144078 | 1/2010 |
| WO | WO0203093 | 1/2002 |
| WO | WO2004/008171 | 1/2004 |
| WO | WO2006043123 | 4/2006 |
| WO | WO2007031844 | 3/2007 |
| WO | WO2008142485 | 11/2008 |
| WO | WO2009015658 | 2/2009 |
| WO | WO2009138555 | 11/2009 |

OTHER PUBLICATIONS

International Search Report for International Application No. PCT/IB2010/051561—Date of Completion of Search: Jan. 7, 2011, 6 pages.

Written Opinion of the International Searching Authority for International Application No. PCT/IB2010/051561—Date of Completion of Opinion: Jan. 7, 2011, 7 pages.

3GPP TS 36.305 V9.1.0 (Dec. 2009), "Stage 2 Functional specification of User Equipment (UE) positioning in E-UTRAN (Release 9)", 52 pages.

3GPP TS 36.355 V9.0.0 (Dec. 2009), "LTE Positioning Protocol (LPP) (Release 9)", 102 pages.

Lauri Wirola, "Studies on Location Technology Standards Evolution in Wireless Networks", Tampere University of Technology, Publication 874, 2010, 255 pages.

LPP extensions (LPPe) (Release 1.0), Doc# OMA-WID_0197-LLPe1_0-V1_0-20100309-A.doc, 2010, 4 pages.

Secure User Plane Location Enabler Release (SUPL) V3.0, Doc# OMA-WID_0183-SUPL_3-V1_0-20090128-A.doc, 2009, 4 pages.

European Supplementary Search Report for EP Application No. EP 10849761—Date of Completion of Search: Sep. 26, 2013, 8 pages.

\* cited by examiner

Relative Positioning Method 1:

Relative Positioning Method 2:

Relative Positioning Method 3:

Relative Positioning Method 4:

Relative Positioning Method 5:

Relative Positioning Method 6:

Relative Positioning Method 7-4:

Relative Positioning Method 7-5:

Relative Positioning Method 8:

Relative Positioning Method 9-4:

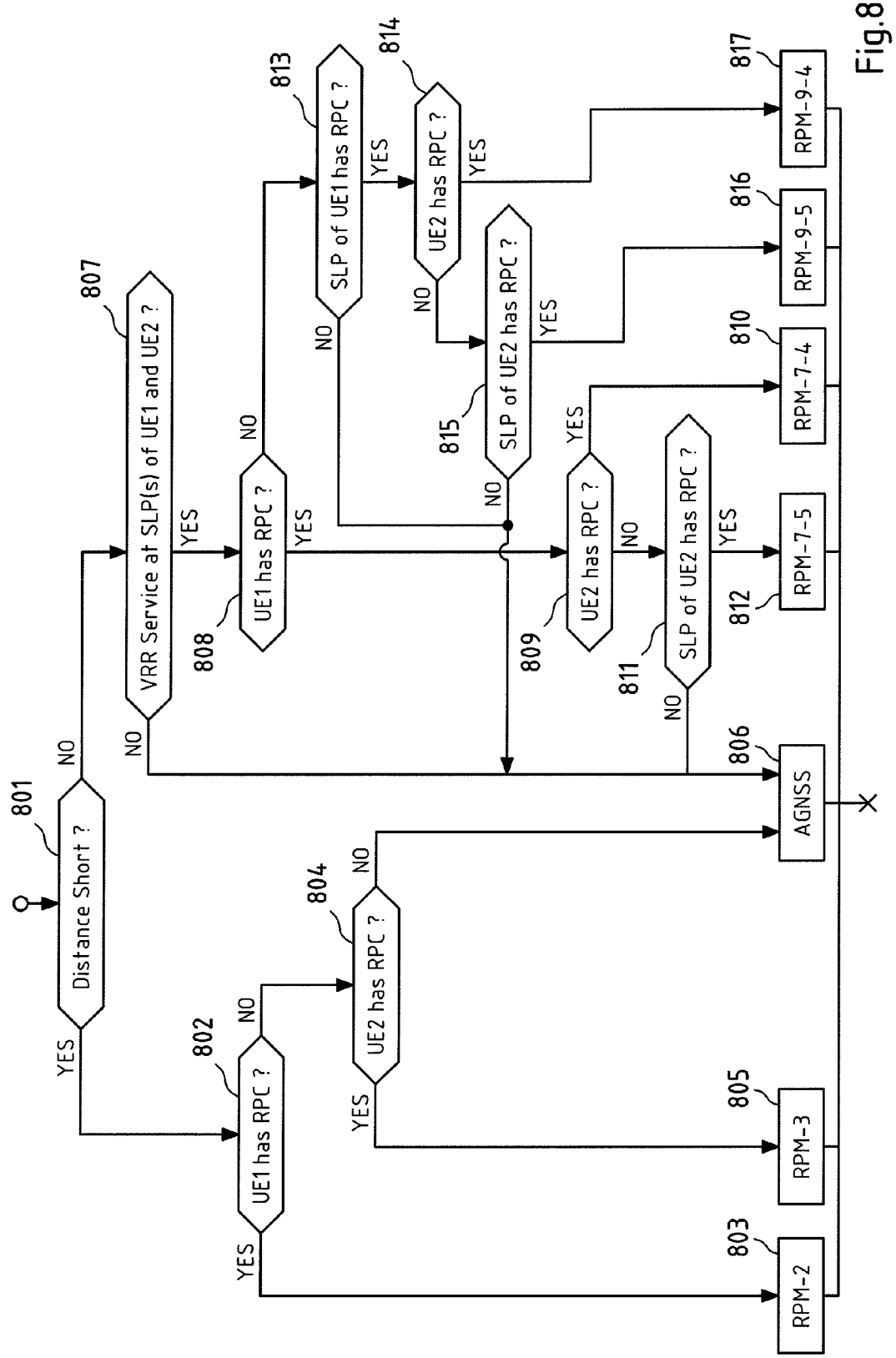

SELECTION OF A RELATIVE POSITIONING METHOD

FIELD

This invention relates to the field of positioning, in particular to relative positioning where an estimate of a relative position between two entities is determined.

BACKGROUND

A relative position between two entities may for instance be represented by a vector in a two- or three-dimensional space between the positions of the two entities, and may for instance be exploited to inform a user of one of the two entities of a direction and distance towards a user of the other entity, for instance to allow both users to meet or to consider meeting.

SUMMARY OF SOME EMBODIMENTS OF THE INVENTION

There may exist situations where at least two different relative positioning methods, which may for instance define which entities are involved in determining a relative position between two entities and how these entities contribute to the determining, are available.

An embodiment of a method according to the present invention thus comprises selecting a relative positioning method from a set of at least two different relative positioning methods that are for determining an estimate of a relative position between a first entity and a second entity, the relative positioning method selected in dependence on at least one of the following criteria:
- an estimated/measured distance between the first entity and the second entity;
- a relative positioning capability, of at least one of the first entity, the second entity and at least one server entity associated with at least one of the first entity and the second entity, to determine an estimate of a relative position between two entities; and
- an availability, at at least one of the at least one server entity, of a service providing data of at least one reference entity useable for determining an estimate of a relative position between the reference entity and one of the first entity and the second entity.

A embodiment of an apparatus according to the present invention is configured to realize or comprises means for realizing at least the operations of the embodiment of the method according to the present invention presented above.

The means of this apparatus can be implemented in hardware and/or software. They may comprise for instance a processor for executing program code for realizing the required functions, a memory storing the program code, or both. Alternatively, they could comprise for instance a circuitry that is designed to realize the required functions, for instance implemented in a chipset or a chip, like an integrated circuit. Further alternatively, the means could be functional modules of a computer program code.

Another embodiment of an apparatus according to the present invention comprises at least one processor and at least one memory including computer program code, the at least one memory and the computer program code configured to, with the at least one processor, cause the apparatus at least to perform the operations of the embodiment of the method according to the present invention presented above. The computer program code included in the memory may for instance at least partially represent software and/or firmware for the processor. Non-limiting examples of the memory are a RAM or ROM that is accessible by the processor.

In these embodiments, the apparatus may for instance be one of the first entity, the second entity and the at least one server entity, or a part thereof.

In these embodiments, the apparatus may further comprise a user interface, such as for instance a display and/or a keyboard or keypad.

An embodiment of a computer program according to the present invention comprises program code for performing at least the operations of the embodiment of the method according to the present invention presented above when the computer program is executed on a processor. The computer program may for instance be distributable via a network, such as for instance the Internet. The computer program may for instance at least partially represent software and/or firmware of a processor. The computer program may for instance be storable and/or encodable in a computer-readable medium. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium. A computer-readable medium is understood to be readable by a computer, such as for instance a processor.

An embodiment of a system according to the present invention comprises a first entity, a second entity and at least one server entity associated with at least one of the first entity and the second entity, wherein at least one of the first entity, the second entity and the at least one server entity is configured to select a relative positioning method from a set of at least two different relative positioning methods that are for determining an estimate of a relative position between the first entity and the second entity, the relative positioning method selected in dependence on at least one of the following criteria:
- an estimated/measured distance between the first entity and the second entity;
- a relative positioning capability, of at least one of the first entity, the second entity and the at least one server entity, to determine an estimate of a relative position between two entities; and
- an availability, at at least one of the at least one server entity, of a service providing data of at least one reference entity useable for determining an estimate of a relative position between the reference entity and one of the first entity and the second entity.

The system may for instance be a communications system, such as for instance a mobile radio communications system, such as for instance the Long Term Evolution (LTE) system specified by the Third Generation Partnership Project (3GPP).

These embodiments of the present invention thus disclose to select a relative positioning method based on at least one criterion out of a set of three criteria comprising an estimated or measured distance between the first entity and the second entity, a relative positioning capability of at least one of the first entity, the second entity and the at least one server entity, and an availability of a service providing data of at least one reference entity. The selection may depend on only one of these criteria, or any combination of two of these criteria, or on all three of these criteria. For instance, consideration of one or more of these criteria may not be necessary if this criterion is or is assumed to be fulfilled. For instance, it may be the case or may be assumed that all entities have the relative positioning capability, or that at least the first entity and the second entity have the relative positioning capability, or that the server entity/entities have the relative positioning capability, and then consideration of the relative positioning capability may not be required in the selection. Similarly, also the availability of the service may be given or assumed for all or at least some of the server entities, and then the availability of the service may not have to be considered in the selection. The criterion related to the estimated/measured distance between the first entity and the second entity may for instance not be considered in the selection if such an estimated/measured distance is not available, or if it shall not be considered in the selection for other reasons.

The selected relative positioning method is for determining an estimate of a relative position between the first entity and the second entity, wherein the relative position may for instance be represented by a vector between the positions of the first entity and the second entity, for instance in a two- or three-dimensional space. These positions may for instance be in geodetic coordinates. The relative position, on the other hand, may be represented as a vector in a global or local coordinate system. In case of a local coordinate system, its origin may have to be stated.

Therein, relative positioning may only be performed for the first entity and the second entity (as a so-called single-baseline solution), but may equally well be performed for more than two entities (as a so-called multi-baseline solution), for instance yielding respective baselines (relative positions) between all pairs of entities. Accordingly, also the relative positioning method may be selected for the single-baseline solution case (i.e. with respect to the first and second entity only), or as part of the multi-baseline solution case (i.e. with respect to more than two entities). Therein, for the selection of a suited relative positioning method, for instance at least one of the first entity and the second entity may function as a representative of a set of at least two entities (for instance of two entities that are closely spaced (e.g. have a distance that is below a threshold). The selected relative positioning method may then for instance be used for all entities in the set of at least two entities in the same way as it is used for the entity that functions as the representative of this set.

Each of the relative positioning methods at least defines which entities are involved in determining the relative position between the first entity and the second entity and how they contribute to the determining. For instance, in one relative positioning method, the first entity, the second entity and at least one server entity may be involved, whereas in another relative positioning method, additionally reference entities may be involved.

The estimated/measured distance may for instance be determined based on a Global Navigation Satellite System (GNSS), such as for instance the Global Positioning System, the Galileo or the GLONASS system, to name but a few examples, or an assisted representation thereof (such as for instance the Assisted GNSS (AGNSS) system, where an AGNSS receiver is furnished with assistance data in addition to the data received from one or more satellites, for instance from a server). Alternatively, the estimated/measured distance may be determined based on an identification of the cells/beacons associated with the first entity and the second entity. The cells or beacons may for instance belong to a wireless communication system, for instance a mobile radio communications system or a WLAN (Wireless Local Area Network).

The estimated/measured distance may for instance be based on knowledge that the first and second entities are in the same cell of the cellular network. The server might for instance have knowledge on the cell characteristics (e.g. maximum range) and thus may deduce, if the entities are closer than a threshold.

Similarly, at least one of the first entity and the second entity might have or have access to a "radiomap" (which may for instance be understood as a collection of communication node coverage area models) that would allow deducing the proximity to the other entity based on the information about the cell the other terminal is located in. For example, if the first entity gets to know that the second entity is in the same cell, then the first entity may check the radiomap, for instance to deduce the maximum distance between the first and second entities.

This estimated/measured distance may for instance be much coarser in accuracy as compared to the magnitude of the estimate of the relative position that is to be determined by the selected relative positioning method. The estimated/measured distance may for instance be at least one order of magnitude less accurate than a magnitude of an estimate of the relative position between the first entity and the second entity achievable with at least one of the relative positioning methods of the set of relative positioning methods (for instance with the selected relative positioning method).

The estimated/measured distance may for instance be compared to a threshold, which may for instance be pre-defined or adaptable, or selectable from a set of at least two pre-defined thresholds. A finding that the estimated/measured distance is below or equal to the threshold or that the estimated/measured distance is above the threshold may for instance be considered in the selection of the relative positioning method. The threshold may for instance be adapted or selected at least partially based on a capability of at least one of the first entity and the second entity to receive and/or measure signals, such as for instance signals to be used for determining an estimate of a relative position. Examples of such signals are GNSS signals, such as for instance Global Positioning System (GPS) L1C/A and L2C signals. For instance, in case that both the first entity and the second entity are capable of receiving GNSS signals of at least two different frequencies (such as for instance of receiving the GPS L1C/A signal and the GPS L2C signal), a larger threshold may be determined or selected as compared to a case where at least one of the first entity and the second entity is only capable of receiving one or more GNSS signals of a single frequency only.

The relative positioning capability is the capability to determine an estimate of a relative position between two entities. The two entities may for instance be the first entity and the second entity, but may equally well be one of the first entity and the second entity, and a reference entity. The estimate of the relative position may thus for instance be the estimate of the relative position between the first entity and the second entity, or may be contributive for determining the estimate of the relative position between the first entity and the second entity (for instance if the estimate of the relative position is between the first/second entity and a reference entity).

The relative positioning capability may for instance be the capability to determine an estimate of a relative position between two entities based on a double difference observable obtained by subtracting a first difference between respective data obtained for two entities with respect to a first satellite of a GNSS system and a second difference between respective data obtained for the two entities with respect to a second satellite of the GNSS system that is different from the first satellite. This data may for instance be code phase and/or carrier phase (ADR) data, for instance measured at an entity (e.g. the first/second entity) or determined (e.g. calculated) for an entity (e.g. for the reference entity). Common mode (for instance atmospheric (tropospheric, ionospheric)) errors may then for instance be cancelled or reduced. The estimate of the relative position between the two entities may for instance be determined by a Real-Time Kinematic (RTK) method.

The service providing data of at least one reference entity useable for determining an estimate of a relative position between the reference entity and one of the first entity and the second entity (which may be contributive for determining the estimate of the relative position between the first entity and the second entity) may for instance be available at a server entity if it is offered by or accessible via the server entity. The data of the at least one reference entity may for instance be actually measured by the reference entity itself, or may be calculated for the reference entity (for instance if the reference entity is virtual). A reference entity used to determine an estimate of a relative position between itself and the first/second entity may be considered to be associated with the first/second entity, respectively. The data provided by the service may further comprise information on the position of the reference entity/entities.

Therein, a first/second entity may be provided with measurements from one or more reference entities. For example, the first/second entity may for instance be provided with measurements from the nearest, say, four reference entities. The first/second entity may then for instance decide if it uses only one of those (the closest, for instance) or more (e.g. all) of them. If measurements from more than one reference entity are used, a multi-baseline problem is solved with respect to these reference entities.

In certain embodiments of the present invention, considering at least one of these three criteria when selecting the relative positioning method allows improving the selection process and/or rendering the relative positioning more efficient and/or accurate. For instance, if the estimated/measured distance between the first entity and the second entity is small (e.g. below a threshold), a relative positioning method may be selected in which involvement of reference entities (which may cause additional calculation and data transmission overhead) is dispensed with. Furthermore, if the first and/or second entity have relative positioning capabilities, a relative positioning method may be selected in which the first and/or second entity actually determine the estimate of the relative position, thus relieving the at least one server entity associated with the first entity and/or the second entity with this task, which may be computationally demanding. Also the availability, at the server entity/entities, of the service for providing data of at reference entities affects a suitable selection of the relative positioning method, because in case of unavailability of such a service, relative positioning has to refrain itself to data measured by the first entity and the second entity.

In a further embodiment of the method according to the present invention, the embodiment of the method according to the present invention presented above further comprises obtaining information on at least those criteria in dependence on which the relative positioning method is selected. This information may be obtained by the entity performing the selection from one or more other entities, for instance based on a protocol (e.g. a positioning protocol such as the LTE Positioning Protocol (LPP) or the Secure User Plane Location Protocol (SUPL)). Correspondingly, in further embodiments of the apparatuses according to the present invention, in the embodiment of the apparatuses according to the present invention presented above, the computer program code and the processor, or some other means, are configured to realize a corresponding function, and in a further embodiment of the computer program according to the present invention, any of the embodiments of the computer program according to the present invention presented above further comprises computer program code defined to cause a corresponding action when executed. This is also the case for a corresponding further embodiment of the system according to the present invention.

In an embodiment of the method according to the present invention, at least one of the embodiments of the method according to the present invention presented above further comprises initiating the selected relative positioning method. The selected relative positioning method may for instance be initiated by performing a first action of the selected relative positioning method. This first action may for instance be to trigger another entity to perform a task, for instance to provide data. Correspondingly, in further embodiments of the apparatuses according to the present invention, in at least one of the embodiments of the apparatuses according to the present invention presented above, the computer program code and the processor, or some other means, are configured to realize a corresponding function, and in a further embodiment of the computer program according to the present invention, at least one embodiment of the computer program according to the present invention presented above further comprises computer program code defined to cause a corresponding action when executed. This is also the case for a corresponding further embodiment of the system according to the present invention.

In further embodiments (see for instance relative positioning methods 1, 2, 3 and 8 presented in the detailed description section) of the method, apparatuses, computer program and system according to the present invention, at least one of the respective embodiments presented above has the further feature that in case that the estimated/determined distance is one of below and below-or-equal-to a threshold, in the selecting of the relative positioning method, the availability of the service for providing data of at least one reference entity (for instance at any server entity) is not considered. The threshold may for instance be pre-defined. Alternatively, it may be adaptable, or selectable from a set of pre-defined thresholds. If the first entity and the second entity are comparably close to each other (as indicated by the estimated/determined distance being equal to or below the threshold), measurement data provided by the first entity and the second entity may be sufficient to accurately determine the estimate of the relative position between the first entity and the second entity, so that further measurement data from reference entities (e.g. virtual reference receivers) may not be required and thus also the availability of a service for providing data from such reference entities may be irrelevant).

In further embodiments (see for instance relative positioning methods 1, 2, 3 and 8 presented in the detailed description section) of the method, apparatuses, computer program and system according to the present invention, at least one of the respective embodiments presented above has the further feature that in case that the estimated/determined distance is one of below and below-or-equal-to a threshold and that at least one of the first entity, the second entity and the at least one server entity has the relative positioning capability, a relative positioning method is selected in which the estimate of the relative position between the first entity and the second entity is determined based on data measured at the first entity and on data measured at the second entity without requiring any data of a reference entity. The threshold may for instance be pre-defined or adaptable, or may be selectable from a set of pre-defined thresholds. The data of the reference entity may for instance be determined for the reference entity by a service that is available at a server entity. The reference entity may for instance be a virtual reference receiver. Dispensing with data from reference entities in the relative positioning method may allow saving calculations for determining the data of the reference entity and/or may allow reducing communication overhead required for transferring such data.

As an example (see for instance relative positioning methods 2 and 8 presented in the detailed description section), in case that the first entity has the relative positioning capability, a relative positioning method may be selected in which the first entity receives data measured at the second entity and determines the estimate of the relative position between the first entity and the second entity based on the data measured at the first entity and on the data measured at the second entity. The data measured at the second entity may for instance be provided to the first entity via a server entity associated with both the first entity and second entity or via server entities respectively associated with the first entity and the second entity. Provision of data measured at the second entity to the first entity may for instance have been triggered by the first entity or by a server entity associated with both the first entity and the second entity, or by a server entity that is associated with one of the first entity and the second entity.

As a further example (see for instance relative positioning method 3 presented in the detailed description section), in case that the second entity has the relative positioning capability, a relative positioning method may be selected in which the first entity causes the second entity to determine the estimate of the relative position between the first entity and the second entity based on the data measured at the first entity and on the data measured at the second entity. The relative positioning method may for instance be initiated by the first entity by triggering the second entity to perform measurements and by providing own measurements to the second entity.

As a still further example (see for instance relative positioning method 1 presented in the detailed description section), in case that the at least one server entity has the relative positioning capability, a positioning method is selected in which the at least one server entity determines the estimate of the relative position between the first entity and the second entity based on the data measured at the first entity and on the data measured at the second entity. The relative positioning method may then for instance be initiated by the at least one server entity by triggering the first entity and the second entity to measure and provide the data.

In further embodiments (see for instance relative positioning methods 4, 5, 6, 7-4, 7-5, 9-4 and 9-5 presented in the detailed description section) of the method, apparatuses, computer program and system according to the present invention, at least one of the respective embodiments presented above has the further feature that in case that the estimated/determined distance is above a threshold, a relative positioning method is selected that is based on measurements performed by the first entity and the second entity and also on data of at least two reference entities. The threshold may for instance be pre-defined or adaptable, or it may be selectable from a set of pre-defined thresholds. The data of the at least two reference entities may for instance be determined for the reference entities by a service that is available at one or more server entities (for instance at a first server entity associated with the first entity and at a second server entity associated with the second entity, or with a common server entity associated with both the first entity and the second entity). The at least two reference entities may for instance be virtual reference receivers. Exploitation of the data from the at least two reference entities may be required since the measured/estimated distance between the first entity and the second entity indicates that both a too far apart from each other, so that determining an estimate of the relative position between both of them may not be particularly accurate.

In further embodiments (see for instance relative positioning methods 4, 5, 6, 7-4, 7-5, 9-4 and 9-5 presented in the detailed description section) of the method, apparatuses, computer program and system according to the present invention, at least one of the respective embodiments presented above has the feature that in case that the service providing the data of the at least one reference entity is available at a common server entity associated with the first entity and the second entity or at both a first server entity associated with the first entity and a second server entity associated with the second entity and that at least one of the first entity, the second entity, the common server entity, the first server entity and the second server entity has the relative positioning capability, a positioning method is selected in which the estimate of the relative position between the first entity and the second entity is determined based on data measured at the first entity, the second entity and at at least two reference entities. The at least two reference entities may for instance be provided by a service available at the common server entity, or by a service or services available at the first server entity and at the second server entity. The relative positioning method is thus selected without considering a measured/estimated distance between the first entity and the second entity. Exploiting data of the at least two reference entities (which may for instance be virtual reference receivers) may contribute to rendering the determined estimate of the relative position between the first entity and the second entity more accurate.

In further embodiments of the method, apparatuses, computer program and system according to the present invention, at least one of the respective embodiments presented above has the further feature that in case that the estimated/determined distance is one of above and above-or-equal-to a threshold, that the service providing the data of the at least one reference entity is available at a common server entity associated with the first entity and the second entity or at both a first server entity associated with the first entity and a second server entity associated with the second entity and that at least one of the first entity, the second entity, the common server entity, the first server entity and the second server entity has the relative positioning capability, a relative positioning method is selected in which the estimate of the relative position between the first entity and the second entity is determined based on data measured at the first entity, the second entity and at at least two reference entities. The at least two reference entities may for instance be provided by a service available at the common server entity, or by a service or services available at the first server entity and at the second server entity. If the measured/estimated distance between the first entity and the second entity is considered to be too large, e.g. equal to or above the threshold, which may for instance be pre-defined or adaptable, or selectable from a set of pre-defined thresholds, exploiting data of the at least two reference entities (which may for instance be virtual reference receivers) may contribute to rendering the determined estimate of the relative position between the first entity and the second entity more accurate than a determined estimate that is only based on measurements from the first entity and the second entity.

In further embodiments of the method, apparatuses, computer program and system according to the present invention, at least one of the respective embodiments presented in the previous two paragraphs has the further feature that the estimate of the relative position between the first entity and the second entity is determined based on an estimate of an absolute position of the first entity and an estimate of an absolute position of the second entity. The relative position may for instance be determined as the vector between the absolute positions of the first entity and the second entity.

In further embodiments of the method, apparatuses, computer program and system according to the present invention, at least one of the respective embodiments presented in the previous paragraph has the further feature that the estimate of the absolute position of the first entity is determined based on respective information on a respective absolute position of at least one of the at least two reference entities that is associated with the first entity and on a respective estimate of a respective relative position between the at least one reference entity associated with the first entity and the first entity, and wherein the estimate of the absolute position of the second entity is determined based on respective information on a respective absolute position of at least one of the at least two reference entities that is associated with the second entity and on a respective estimate of a respective relative position between the at least one reference entity associated with the second entity and the second entity.

As an example (see for instance relative positioning methods 4 and 7-4 presented in the detailed description section), in the selected relative positioning method, the respective estimate of the respective relative position between the at least one reference entity associated with the first entity and the first entity may be determined by the first entity, and the respective estimate of the respective relative position between the at least one reference entity associated with the second entity and the second entity may be determined by the second entity. This relative positioning method may for instance be selected in case of relative positioning capability at the first entity and at the second entity and of availability of the service for providing at least one reference entity at the common server entity or at both the first server entity and the second server entity. The relative positioning method may then for instance (see for instance relative positioning method 7-4 presented in the detailed description section) be initiated by the first entity by requesting the absolute position from the second entity, or for instance (see for instance relative positioning method 4 presented in the detailed description section) by at least one server entity (e.g. the common server entity or both the first server entity and the second server entity) by requesting the absolute positions from the first entity and the second entity.

As another example (see for instance relative positioning method 5 and 9-5 presented in the detailed description section), in the selected relative positioning method, the respective estimate of the respective relative position between the at least one reference entity associated with the first entity and the first entity may be determined by a server entity associated with the first entity (e.g. the common server entity or the first server entity), and the respective estimate of the respective relative position between the at least one reference entity associated with the second entity and the second entity may be determined by a server entity associated with the second entity (e.g. the common server entity or second server entity). Both server entities may for instance be the same (e.g. the common server entity). This relative positioning method may for instance be selected in case of relative positioning capabilities at the common server entity or at both the first server entity and the second server entity and of availability of the service for providing data of at least one reference entity at the common server entity or at both the first server entity and the second server entity (and for instance in additional absence of relative positioning capabilities at both the first entity and the second entity). The relative positioning method may for instance (see for instance relative positioning method 5 presented in the detailed description section) be initiated by at least one server entity (e.g. the common server entity, or both the first server entity and the second server entity) by requesting data measured at the first entity from the first entity and data measured at the second entity from the second entity. Alternatively, the relative positioning method may for instance (see for instance relative positioning method 9-5 presented in the detailed description section) be initiated by the first entity by requesting the absolute position of the second entity from the second entity, for instance via a server entity (either the common server entity or one or both of the first server entity and the second server entity), and by further requesting its own absolute position from the common server entity or the first server entity.

As still another example (see for instance relative positioning methods 6 and 7-5 presented in the detailed description section), in the selected relative positioning method, the respective estimate of the respective relative position between the at least one reference entity associated with the first entity and the first entity may be determined by the first entity, and the respective estimate of the respective relative position between the at least one reference entity associated with the second entity and the second entity may be determined by the server entity associated with the second entity. This relative positioning method may for instance be selected in case of relative positioning capabilities at the first entity and the server entity associated with the second entity and of availability of the service for providing data of at least one reference entity at the common server entity or at both the first server entity and the second server entity. This relative positioning method may for instance be initiated by the first entity by requesting an absolute position from the second entity (e.g. via at least one server entity). The second entity may then for instance request this absolute position from the at least one server entity, and may—for instance upon request from the at least one server entity—provide data measured at the second entity to the at least one server entity to enable the at least one server entity to determine the absolute position of the second entity, which absolute position may then be provided to the second entity, and then to the first entity that initially requested this absolute position. Alternatively, the relative positioning method may for instance be initiated by the server entity associated with the second entity. Therein, the server entity associated with the second entity may be a common server entity that is associated with both the first entity and the second entity.

As still another example (see for instance relative positioning methods 9-4 presented in the detailed description section), in the selected relative positioning method, the respective estimate of the respective relative position between the at least one reference entity associated with the first entity and the first entity may be determined by the server entity associated with the first entity, and the respective estimate of the respective relative position between the at least one reference entity associated with the second entity and the second entity may be determined by the second entity. This relative positioning method may for instance be selected in case of relative positioning capabilities at the second entity and the server entity associated with the first entity and of availability of the service for providing data of at least one reference entity at the common server entity or at both the first server entity and the second server entity. This relative positioning method may for instance be initiated by the first entity by requesting an absolute position from the second entity (e.g. via at least one server entity). The second entity may then for instance determine its absolute position based on own measurements and on measurement data of its associated reference entity, and provide this position to the first entity.

In further embodiments of the method, apparatuses, computer program and system according to the present invention, at least one of the respective embodiments presented above has the further feature that communication between the first entity and its associated server entity and between the second entity and its associated server entity is at least partially based on the Secure User Plane Protocol. The Secure User Plane Protocol (SUPL) is specified by the Open Mobile Alliance (OMA). An actual realization of the SUPL is the User Plane Protocol (ULP), which for instance carries the Long Term Evolution (LTE) Positioning Protocol (LPP) specified by the Third Generation Partnership Project (3GPP). In the scope of the SUPL, the first entity and the second entity then constitute SUPL-enabled Terminals (SETs), whereas the at least one server entity constitutes a SUPL Location Platform (SLP).

In further embodiments of the method, apparatuses, computer program and system according to the present invention, at least one of the respective embodiments presented above has the further feature that communication between the first entity and its associated server entity and between the second entity and its associated server entity is at least partially based on the Long Term Evolution Positioning Protocol (LPP). The LPP is specified by the Third Generation Partnership Project, for instance in document 3GPP TS 36.355. It may use the services of the SUPL. In the context of the LPP, the first entity and the second entity would constitute User Equipments (UEs), and the at least one server entity would constitute an SLP. There also exist OMA LPP Extensions, see for instance document "OMA-WID_0197-LPPe1_0-V1_0-20100309-A" available online from the OMA.

In further embodiments of the method, apparatuses, computer program and system according to the present invention, at least one of the respective embodiments presented above has the further feature that the service providing data of at least one reference entity is a virtual reference receiver service providing data of at least one virtual reference receiver. These virtual reference receivers may for instance be provided in the context of an RTK setup.

In further embodiments of the method, apparatuses, computer program and system according to the present invention, at least one of the respective embodiments presented above has the further feature that the first entity and the second entity are mobile terminals of a mobile radio communications system. The mobile radio communications system may for instance be the LTE system specified by 3GPP, or any other mobile radio communications system. The at least one server entity may then for instance be network elements or parts thereof of the mobile radio communications system.

The embodiments of the method, apparatuses, computer program and system according to the present invention presented above and their single features are understood to be disclosed also in all possible combinations with each other.

Further, it is to be understood that the presentation of the invention in this section is based on non-limiting example embodiments.

Other features of the invention will be apparent from and elucidated with reference to the detailed description presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

BRIEF DESCRIPTION OF THE FIGURES

In the figures show:

FIG. 8: a flowchart of an embodiment of a method for selecting a relative positioning method according to an embodiment of the present invention, where relative positioning is initiated by a User Equipment (UE)

DETAILED DESCRIPTION OF EMBODIMENTS OF THE INVENTION

Figure 1A:
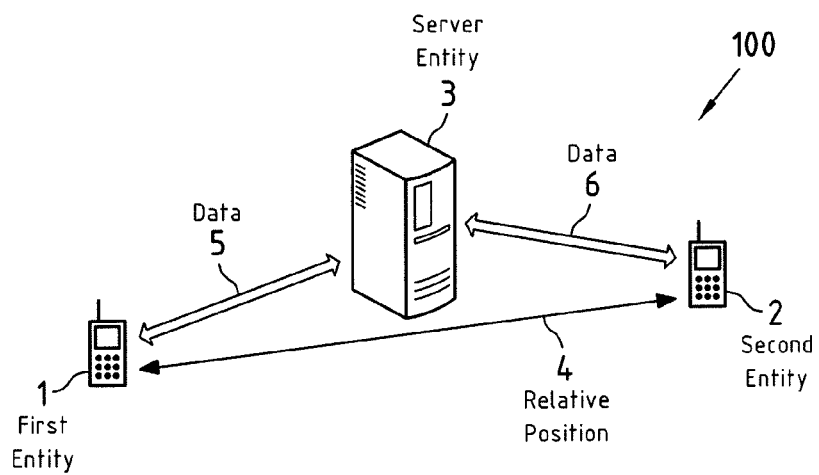
FIG. 1a: A first embodiment of a system according to the present invention.

Relative positioning is a positioning method in which one entity or device is positioned with respect to another entity or device. The purpose is to determine an estimate of the relative position between the two entities accurately, not the absolute positions of the devices (although those may be intermediate results in the position calculation). In the following, the abbreviation "RPM" will be used for the term "Relative Positioning Method".

Therein, the relative position between two entities, which is also denoted "baseline", may for instance be imagined as the vector (distance and direction) between the entities positioned relative to each other. This vector may be in two- or three-dimensional space.

Note that, although the present specification focuses on the relative position, the disclosure (for instance the different techniques for selecting an RPM) equally applies also to the relative velocity, which can be obtained as the first derivative of the relative position).

Relative positioning may be performed between two entities or between an entity and a reference entity. Moreover, also a multi-baseline solution is possible with the baselines being solved between multiple entities/reference entities.

One comparably simple form of relative positioning is forming the difference between the absolute positions of the two entities, which absolute positions may for instance be obtained based on GNSS/AGNSS-based techniques.

However, relative positioning also refers to high accuracy methods including techniques such as for instance Real-Time Kinematic (RTK) that may achieve sub-dm accuracies. This is in contrast to the accuracy obtained from the difference between two absolute positions, which results in the baseline accuracy of several meters or even tens of meters.

An in-depth description of RTK can for instance be found in chapter 2.1.5 of inventor's dissertation entitled: "Studies on Location Technology Standards Evolution in Wireless Network", Lauri Wirola, Tampere University of Technology, Publication 874, 2010. RTK is based on obtaining continuous periodic carrier phase measurements (for instance Accumulated Delta Range, ADR, measurement) and/or code phase measurements from two Global Navigation Satellite System (GNSS) receivers, which can be terminals and/or virtual/physical reference receivers, and linearly combining the measurements from the receivers in such a way that common mode errors cancel.

The basic observable of RTK is a double difference $$\phi_{km}{}^{pq} = (\phi_k{}^p - \phi_m{}^p) - (\phi_k{}^q - \phi_m{}^q)$$

that is obtained by forming a difference between a first single difference $\phi_k{}^p - \phi_m{}^p$ and a second single difference $\phi_k{}^q - \phi_m{}^q$, with $\phi_k{}^p$ and $\phi_m{}^p$ for instance denoting the ADR measurement (or code phase measurement) made by receivers k and m with respect to satellite p, respectively, and $\phi_k{}^q$ and $\phi_m{}^q$ denoting the ADR measurement made (or alternatively code phase measurement) by receivers k and m with respect to satellite q, respectively.

Since the double difference observable can be expressed as a function of the baseline between the two receivers k and m, this baseline can be calculated from the double difference observables, for instance based on well-known Extended Kalman Filter (EKF) and well-known Least Squares Ambiguity Decorrelation Adjustment (LAMBDA) methods.

Therein, the single differencing allows cancelling the satellite clock biases with respect to the GNSS System Time (GST). The double differencing allows cancelling the receiver clock biases with respect to the GST.

In professional use, frequently dual-frequency receivers (for receiving both the L1 and L2 signals) are used. Having dual-frequency capability may for instance allow for compensating the residual ionosphere errors.

Nevertheless, in case the baseline between the two receivers k and m is "short", for instance in the order of a few kilometers maximum, the flight paths of the signal from a given satellite to the two receivers can be assumed to be equivalent, allowing to further cancel common mode errors (e.g. ionospheric advances and tropospheric delays) from the double difference. In this case, for instance also single-frequency receivers may be used.

However, in any case, the shorter the baseline, the more straightforward and easier accurate solving of the baseline may be.

It should be noted that the method of forming double differences is disclosed as a non-restrictive exemplary method. For example, alternatively methods utilizing only single differences may be applied.

FIG. 1a shows a first embodiment of a system 100 according to the present invention. The system 100 comprises a first entity 1, a second entity 2 and a server entity 3. To allow determination of an estimate of the baseline (relative position) 4 between entities 1 and 2, for instance based on RTK as described above, these entities communicate with server 3 via data connections 5 and 6, which may be of wire-bound or wireless type.

In system 100, an estimate of the baseline 4 is considered to be determined only based on measurements (e.g. carrier and/or code phase measurements) made by entities 1 and 2, which is for instance possible in case that entities 1 and 2 have a distance that is below a pre-defined distance threshold (for instance less than 15, 10 or 5 kilometers).

Figure 1B:
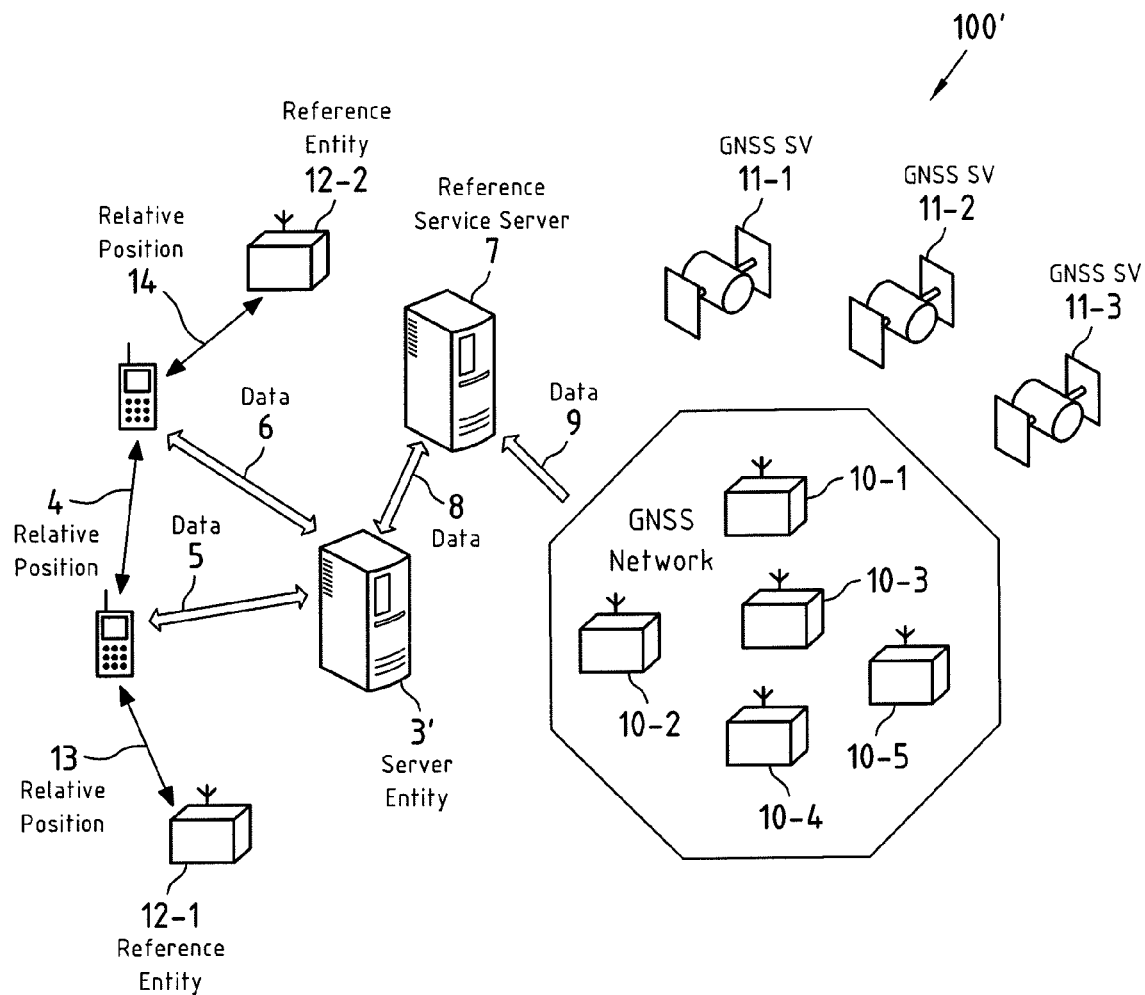
FIG. 1b: a second embodiment of a system according to the present invention.

FIG. 1b is a second embodiment of a system 100' according to the present invention. System 100' again comprises a first entity 1 and a second entity 2, between which an estimate of baseline 4 is to be determined. However, server entity 3' is modified as compared to system 100 of FIG. 1a, because at server entity 3', a reference service is available. This reference service is provided to server entity 3' by a reference service server 7 via a data connection 8, which may be a wire-bound or wireless connection. Reference service server 7 may be integrated in server entity 3', but may equally well be an external and remote component.

Reference service server 7 operates a network of GNSS receivers 10-1 . . . 10-5. This enables reference service server 7 to provide measurement data of one or more virtual reference receivers 12-1 and 12-2 to server entity 3'. This measurement data of reference entities 12-1 and 12-2 may for instance be derived from the measurement data of GNSS receivers 10-1 . . . 10-5, for instance by interpolation and/or extrapolation techniques. This measurement data may for instance be corrected/modified in various ways in order to provide improved position quality to service users.

It should be noted that reference service server 7 may alternatively only be able to provide measurement data of GNSS receivers at their respective positions, rather than providing measurement data of virtual reference receivers derived (e.g. extrapolated/interpolated/corrected) from measurements of the GNSS receivers. In this case, measurement data may thus only be provided from nodes of a grid that are formed by the positions of the GNSS receivers.

In any case, the measurement data provided by reference service server 7 may for instance be carrier and/or code phase measurement data with respect to one or more of the satellites 11-1 . . . 11-3 of one or more GNSS systems. It should be noted that GNSS receivers 10-1 . . . 10-5 are only confined to a limited area in FIG. 1b for presentation purposes. It is readily clear that GNSS receivers 10-1 . . . 10-5 may in practice be distributed over the entire area in which entities 1 and 2 and reference entities 12-1 and 12-2 are contained.

In embodiments of the present invention, the reference service provided by reference service server 7 to server entity 3' is referred to as Virtual Reference Receiver (VRR) service, and the reference entities 12-1 and 12-2 of which the VRR service is able to provide measurements are referred to as VRRs. A VRR service may for instance generate a VRR on request to the desired location, or alternatively provide a large number of VRRs on a static grid. When an entity needs to be relatively positioned with respect to a VRR, then for instance the VRR closest to the entity may be chosen from the set of VRRs.

An advantage of using one or more VRRs in relative positioning is that a VRR (e.g. VRR 12-1) can be generated at or close to the location of the entity (e.g. first entity 1) to be positioned relative to the VRR. Therefore, the baseline between the entity and the VRR is by definition very short.

Moreover, because of its computational nature the location of the VRR is known very accurately. Thus solving the baseline between the VRR and the entity allows for determining also the absolute location of the entity at very high accuracy.

It is to be noted that the use of a VRR may require the knowledge of the coarse location of the entity to be relatively positioned. This coarse location can for instance be obtained using the conventional GNSS or AGNSS (Assisted GNSS), or based on a cell/beacon identification. In AGNSS, as described in chapter 2.2 of inventor's dissertation already specified above, a AGNSS receiver is provided with further information (which may for instance comprise integrity information and/or ephemerides from a network of physical GNSS receivers, orbit and/or clock models from external service providers, and/or troposphere delay forecasts from meteorological institutes, to name but a few examples) from an AGNSS server, allowing to enhance the AGNSS receiver's absolute position estimate and usually also positioning performance in general (such as speed and availability of positioning service).

In system 100' of FIG. 1b, an estimate of the baseline 4 is thus considered to be determined based on measurements made by entities 1 and 2 and also by reference entities 12-1 and 12-2. For instance, an estimate of the baseline 13 between reference entity 12-1 and first entity 1 may be determined by relative positioning techniques (e.g. by RTK), and based on the knowledge of the absolute position of reference entity 12-1, then also the absolute position of first entity 1 may be determined. Similarly, an estimate of the baseline between 14 between second entity 2 and reference entity 12-2 may be determined, yielding, based on knowledge of the absolute position of reference entity 12-2, the absolute position of second entity 2. The absolute positions of first entity 1 and second entity 2 may then be subtracted to obtain an estimate of their baseline 4.

It should be noted that relative positioning as shown in FIG. 1a is preferably performed only in case if the distance between entities 1 and 2 is small, whereas the relative positioning as shown in FIG. 1b can be performed irrespective of the distance between entities 1 and 2 (since a short respective distance between entities 1 and 2 and their respective reference entities 12-1 and 12-2 is ensured by the selection/placement of the reference entities 12-1 and 12-2).

A more detailed presentation on various RPMs that define which entities are involved in the relative positioning and how they contribute to the relative positioning, and on how a suitable RPM is selected, will be given with respect to FIGS. 7a-7i and FIGS. 8-9 below.

Embodiments of the present invention conduct relative positioning in the context of the Secure User Plane Location (SUPL) protocol, 3GPP LPP and Open Mobile Alliance (OMA) LPP Extensions, which is currently under development by the OMA.

Various positioning protocols exist for the control plane of cellular networks (and are integral parts of these cellular networks), such as for instance the Radio Resource Location Services Protocol (RRLP) for the GERAN (the Radio Access Network of the Global System for Mobile Communications (GSM) and/or the Enhanced Data Rates for Global Evolution (EDGE)), the Radio Resource Control Protocol (RRC) for UTRAN (the RAN of the terrestrial Universal Mobile Telecommunications System (UMTS)) and the LPP (the Long Term Evolution (LTE) Positioning Protocol) for the LTE.

The SUPL protocol is intended to provide the same functionality in the user plane (such as an IP-network), as the above-listed control plane positioning protocols provide in the control plane.

The role of SUPL is two-fold. On the one hand, it provides services including triggered services, in which the SUPL-Enabled Terminal (SET), for instance the first entity 1 in FIGS. 1a and 1b), may be instructed to report its location to the SUPL server, for instance in case a certain spatial or temporal criterion is fulfilled. These are called geographic and periodic triggers, respectively. SUPL also provides authentication of the SET, security, privacy and charging of services through other enablers defined by OMA, the Third Generation Partnership Project (3GPP) or other standardization fora. Therefore, the OMA location service architecture can be considered to be a complete end-to-end solution.

Figure 6:
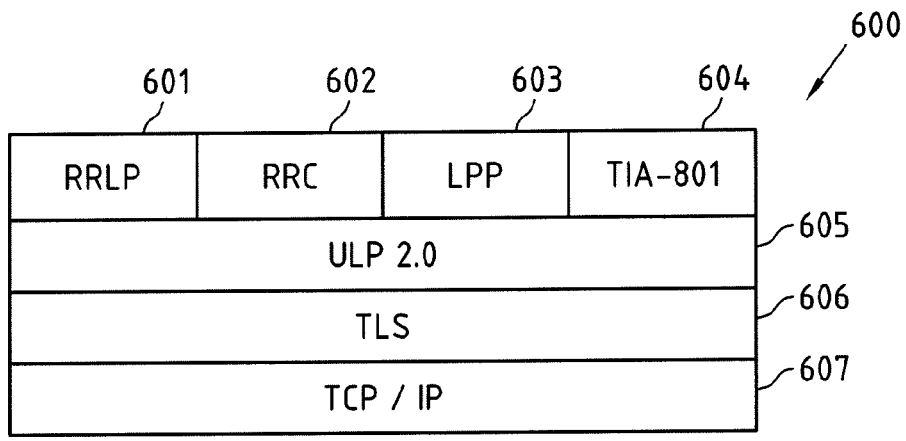
FIG. 6: a schematic illustration of the Open Mobile Alliance Secure User Plane Location (Release 2) protocol stack.

On the other hand, SUPL also provides signalling for the actual positioning of the SET through the re-use of 3GPP-defined positioning methods including RRLP, RRC and LPP. This is indicated in FIG. 6 showing the SUPL (Release 2) protocol stack 600. The transport medium for SUPL is TCP/IP (Transport Control Protocol/Internet Protocol, see layer 607) added with TLS (Transport Layer Security, see layer 606). The ULP (User Plane Location Protocol, see layer 605) is the SUPL service protocol. ULP encapsulates the 3GPP positioning protocols (RRLP 601, RRC 602, LPP 603 and TIA-801 604) as sub-protocols to the ULP. SUPL Release 1 was finalized in 2007 and included support for GSM, Wideband Code Division Multiple Access (WCDMA) and Code Division Multiple Access (CDMA) bearers including the Network Measurement Results (NMRs) and the RAN-specific positioning protocols. The TIA-801 604 shown in FIG. 6 is the positioning protocol for the CDMA networks. SUPL Release 2 is currently in the Candidate Release phase and is expected to be completed in 2010. It is backwards compatible to Release 1, but also introduces a wide variety of improvements. Firstly, the bearer support was extended to include Interworking Wireless Local Area Network (I-WLAN), Worldwide Interoperability for Microwave Access (WiMAX), LTE and Universal Mobile Broadband (UMB) along with their NMRs in the ULP layer 605. The SUPL Release 2 also includes the support for LPP 603 as shown in FIG. 6. Another improvement in the positioning technologies is the addition of fine time assistance for UTRAN in the ULP layer 605. This allows utilizing RRLP as the positioning protocol even in the case the SET would use UTAN as the air interface.

As stated above, some embodiments of the present invention conduct relative positioning in the context of the SUPL protocol. In such a context, the entities 1 and 2 of FIGS. 1*a* and 1*b* then would be denoted as SETs, and the server entities 3 and 3' would be denoted as SUPL Location Platforms (SLPs).

Furthermore, if the SUPL protocol (see ULP layer 605 of FIG. 6) encapsulates the LPP protocol 603 of an LTE radio communications system (i.e. the ULP 605 of FIG. 6 serves as the carrier protocol for the LPP 603), in the dictation of the LPP protocol, the entities 1 and 2 of FIGS. 1*a* and 1*b* would be denoted as User Equipments (UEs), and the server entities 3 and 3' would again be denoted as SLPs. Therein, architecturally, LPP is a protocol between a "target" (a UE to be positioned) and a "server" (providing, for example, positioning instructions and assistance). The LPP is described in detail in technical specification 3GPP TS 36.355 (for instance in Release 9 version V9.0.0 dated January 2010).

Especially useful 3GPP LPP and OMA LPP Extensions will be in the context of SUPL Release 3.0 (see document OMA-WID_0183-SUPL_3-V1_0-20090128-A, available online from the OMA), which will allow taking advantage of the full LPP capabilities including periodic assistance needed for relative positioning including RTK.

Figure 2:
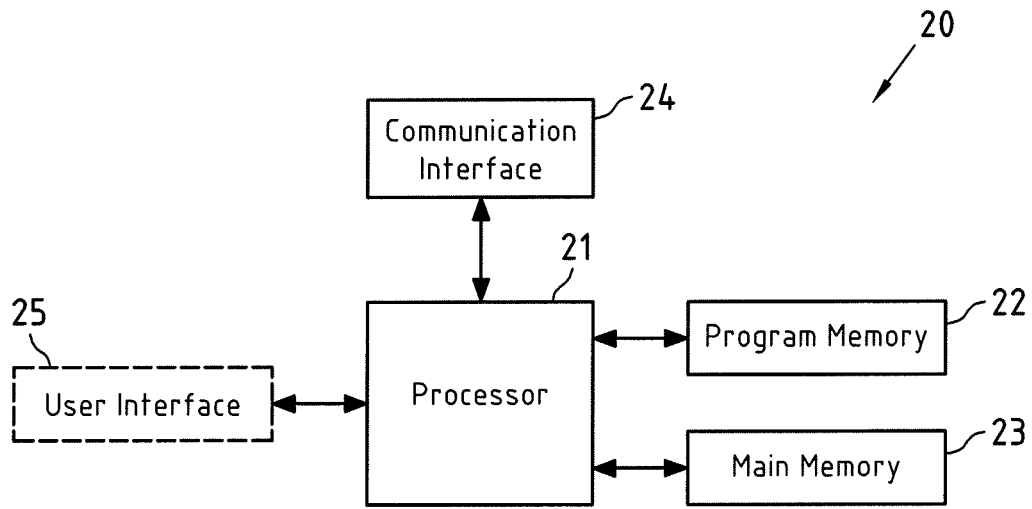
FIG. 2: a schematic block diagram of an embodiment of an apparatus forming part of a first entity or a second entity according to the present invention.

FIG. 2 is a schematic block diagram of an embodiment of an apparatus 20 forming part of a first entity 1 (see FIGS. 1*a* and *b*) or a second entity 2 (see FIGS. 1*a* and 1*b*) according to the present invention. As already stated, in embodiments of the present invention, these entities 1 and 2 may for instance represent UEs/SETs according to the LPP/SUPL positioning protocols.

Apparatus 20 comprises a processor 21, which may for instance be embodied as a microprocessor, Digital Signal Processor (DSP) or Application Specific Integrated Circuit (ASIC), to name but a few non-limiting examples. Processor 21 executes a program code stored in program memory 22 (for instance program code implementing the embodiment of a method for selecting an RPM shown in FIG. 5, or program code at least partially implementing an RPM), and uses main memory 23 as a working memory, for instance to at least temporarily store intermediate results, but also to store for instance pre-defined parameters or thresholds. Some or all of memories 22 and 23 may also be included into processor 21. Memories 22 and/or 23 may for instance be embodied as Read-Only Memory (ROM), Random Access Memory (RAM), to name but a few non-limiting examples. One of or both of memories 22 and 23 may be fixedly connected to processor 21 or removable from processor 21, for instance in the form of a memory card or stick.

Processor 21 further controls a communication interface 24 configured to receive and/or output information. For instance, communication interface 24 may be configured to exchange information with other components of system 100 (see FIG. 1*a*) or system 100' (see FIG. 1*b*), for instance with server entity 3 or 3'. This may for instance comprise sending/receiving one or more requests, measurement data, information on relative positioning capabilities of components and/or information on reference service availabilities. This communication may for instance be based on a wire-bound or wireless connection. Communication interface 24 may thus for instance comprise circuitry such as modulators, filters, mixers, switches and/or one or more antennas to allow transmission and/or reception of signals. In embodiments of the present invention, communication interface 24 is configured to allow communication according to the LPP and/or the SUPL protocols (or derivatives/further developed versions of these protocols), and/or also of protocols beneath the LPP/SUPL protocol, as depicted in the protocol stack 600 of FIG. 6.

Processor 21 further controls an optional user interface 25 configured to present information to a user of apparatus 20 (e.g. to a user of first entity 1 or second entity 2 of FIGS. 1*a* and 1*b*) and/or to receive information from such a user. Such information may for instance comprise information on an RPM selected by processor 21 and/or on a relative position determined according to a selected RPM. If the entities 1 and 2 are mobile terminals or a radio communications system, user interface 25 may for instance be the standard user interface via which a user of entities 1 or 2 interacts with the mobile terminal.

Figure 3:
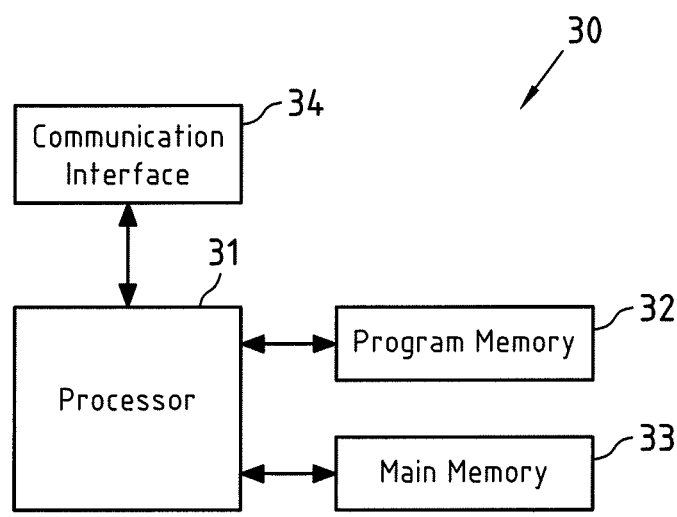
FIG. 3: a schematic block diagram of an embodiment of an apparatus forming part of a server entity according to the present invention.

FIG. 3 is schematic block diagram of an embodiment of an apparatus 30 forming part of a server entity 3 (see FIG. 1*a*) or 3' (see FIG. 1*b*) according to the present invention. As already stated above, in embodiments of the present invention, these server entities 3 or 3' may represent a SLP of the LPP/SUPL positioning protocols.

Apparatus 30 comprises a processor 31, which may for instance be embodied as a microprocessor, Digital Signal Processor (DSP) or Application Specific Integrated Circuit (ASIC), to name but a few non-limiting examples. Processor 31 executes a program code stored in program memory 32 (for instance program code implementing the embodiment of a method for selecting an RPM shown in FIG. 5, or program code at least partially implementing an RPM), and uses main memory 33 as a working memory, for instance to at least temporarily store intermediate results, but also to store for instance pre-defined parameters or thresholds. Some or all of memories 32 and 33 may also be included into processor 31. Memories 32 and/or 33 may for instance be embodied as Read-Only Memory (ROM), Random Access Memory (RAM), to name but a few non-limiting examples. One of or both of memories 32 and 33 may be fixedly connected to processor 31 or removable from processor 31, for instance in the form of a memory card or stick.

Processor 31 further controls a communication interface 34 configured to receive and/or output information. For instance, communication interface 34 may be configured to exchange information with other components of system 100 (see FIG. 1*a*) or system 100' (see FIG. 1*b*), for instance with entities 1 and/or 2, and/or with reference service server 7. This may for instance comprise sending/receiving one or more requests, measurement data, assistance data, information on relative positioning capabilities of components and/or information on reference service availabilities. This communication may for instance be based on a wire-bound or wireless connection. Communication interface 34 may thus for instance comprise circuitry such as modulators, filters, mixers, switches and/or one or more antennas to allow transmission and/or reception of signals. In embodiments of the present invention, communication interface 34 is configured to allow communication according to the LPP and/or the SUPL protocols (or derivatives/further developed versions of these protocols), and/or also of protocols beneath the LPP/SUPL protocol, as depicted in the protocol stack 600 of FIG. 6.

It is to be noted that the circuitry formed by the components of apparatuses 20 and 30 may be implemented in hardware alone, partially in hardware and in software, or in software only, as further described at the end of this specification.

Figure 4:
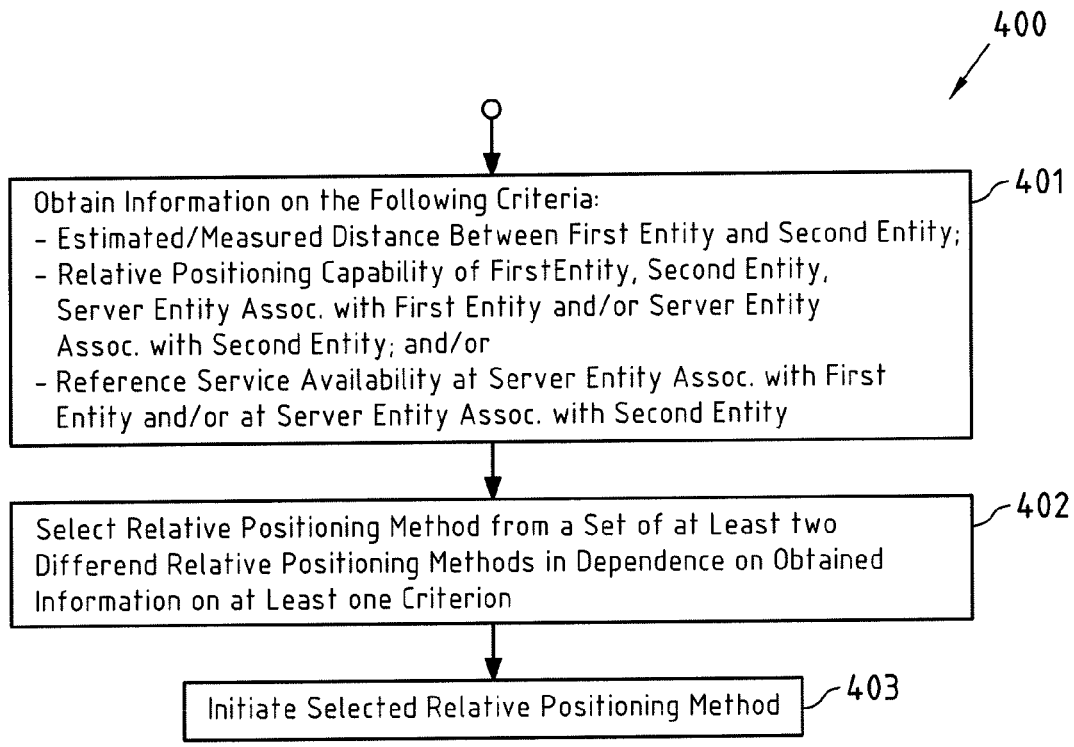
FIG. 4: a flowchart of an embodiment of a method performed by a first entity, second entity or server entity according to the present invention.

FIG. 4 is a flowchart 400 of an embodiment of a method performed by a first entity 1 (see FIGS. 1a and 1b), second entity 2 or server entity 3/3' according to the present invention, to selected an RPM from a set of at least two different RPMs (such as for instance the RPMs described with reference to FIGS. 7a-7i below). This flowchart may for instance be executed by processor 21 of FIG. 2 or processor 30 of FIG. 3, and may respectively be stored as a computer program in program memory 22 of FIG. 2 or in program memory 32 of FIG. 3.

Figure 5:
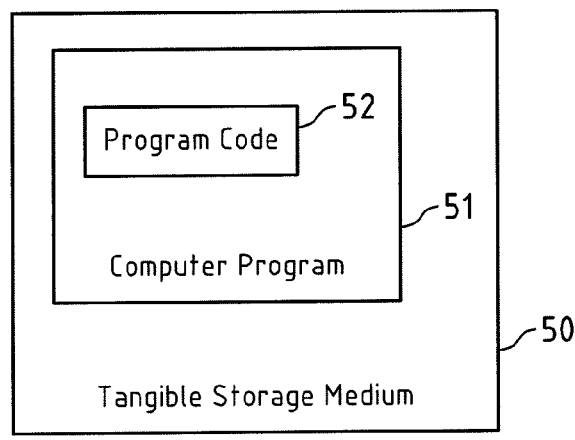
FIG. 5: a schematic presentation of an embodiment of a tangible storage medium according to the present invention.

In particular, as illustrated in FIG. 5, flowchart 400 may be implemented in program code 52 (for instance a set of instructions) that forms a program 51 that in turn is stored on a tangible storage medium 50, which is a non-transitory storage medium. Realizations of tangible storage medium 50 may then for instance be program memories 22 and 32 of FIGS. 2 and 3.

Returning to the flowchart 400 of FIG. 4, in a step 401, information on the following criteria is received:

An estimated/measured distance between first entity 1 and second entity 2 (see FIGS. 1a and 1b);

A Relative Positioning Capability (RPC) of the first entity 1, the second entity 2, the server entity associated with the first entity 1 (for instance server entity 3 or 3') and/or the server entity associated with the second entity 2 (for instance server entity 3 or 3'); and/or A reference service (e.g. VRR service) availability at the server entity associated with the first entity 1 (for instance server entity 3 or 3') and/or at the server entity associated with the second entity 2 (for instance server entity 3 or 3').

Therein, it is to be noted that the first entity 1 and the second entity 2 can be associated with different server entities, or with the same common server entity (the latter case is shown in FIGS. 1a and 1b).

It is to be noted that it is not required to obtain information on all three criteria listed above. For instance, in embodiments of the present invention, information on the estimated/measured distance between first entity 1 and second entity 2, and/or information on the availability of a reference service may not be used.

Similarly, with respect to the second and third criterion, in some embodiments of the present invention, it may not be necessary to obtain this information for every component that is or may be involved, but only for one or some components. For instance, in some embodiments of the present invention, information on the RPC of one of the first entity 1, the second entity 2 or a server entity associated with one of the first entity 1 and the second entity 2 may be sufficient to select an RPM (see the flowcharts of FIGS. 8 and 9). Similarly, in some embodiments of the present invention, it may be sufficient to obtain information on the availability of a reference service associated with only one of the first entity 1 and the second entity 2, instead of both (if there is no common server entity for both the first entity 1 and the second entity 2).

The information obtained in step 401 may obtained by a component of systems 100/100' (see FIGS. 1a and 1b) internally and/or may be obtained from other components by according communication. For instance, if first entity 1 executes the flowchart 400, information on the estimated/measured distance may be obtained by first entity 1 by measuring/estimating its own position and by obtaining an according position measurement/estimate from second entity 2 (e.g. via server entity 3/3') and deriving the distance by subtraction of these positions. Similarly, information on the RPC of entity 1 may be determined by entity 1 by itself (for instance read from an internal memory such as memory 23 of FIG. 2, where it may be stored as a flag), whereas information on the RPC of server entity 3/3' and/or of second entity 2 may be obtained from server entity 3/3' and/or second entity 2, respectively. Information on the availability of the reference service at the server entities 3/3' may for instance be present in the first device 1 (for instance since it is communicated to the first device 1 when it is associated with server 3/3') or may be requested from server 3/3'.

In step 402 of flowchart 400, an RPM from a set of at least two different positioning methods is selected in dependence on some or all of the information obtained in step 401. Examples of rules guiding this selection will be explained with reference to FIGS. 8 and 9 below.

In a step 403, the selected RPM is then initiated. This may for instance be performed by sending one or more requests to other components of system 100/100' that trigger further actions of these components. Examples of such requests and actions will also be described with reference to FIGS. 8 and 9 below.

In the following, some examples of different RPMs that can be performed in the systems 100 and 100' of FIGS. 1a and 1b to determine an estimate of the relative position (baseline) 4 between the first entity 1 and the second entity 2 will be described under the assumption that the LPP/SUPL protocol combination (see FIG. 6) is used to allow user plane positioning. Entities 1 and 2 will thus be denoted as UE1 and UE2 (or also as SETs) and server entities 3/3' will be denoted as SLP. Furthermore, the reference entities 12-1 and 12-2 will be referred to as VRRs, and the reference service will be denoted as VRR service. Therein, a coarse position estimate may for instance be understood as an estimate that is performed without involving relative positioning based on a double difference observable (such as for instance RTK). In contrast, an estimate with high Quality of Service (QoS) in accuracy sense may for instance be understood to involve relative positioning based on a double difference observable (such as for instance RTK).

It is readily clear for a person skilled in the art that the principles of the different RPMs shown in FIGS. 7a-7k are not restricted to application in the context of LPP/SUPL and can be generalized to any generic positioning system such as the systems 100 and 100' of FIGS. 1a and 1b. This also holds for the selection rules described also in the context of LPP/SUPL with reference to FIGS. 8 and 9 below.

It is to be noted that in the RPMs of FIGS. 7a-7k, for the sake of simplicity of presentation, it is assumed that both UEs/SETs are associated with the same SLP. Alternatively, both UEs/SETs may be associated with different SLPs. It is readily clear for a person skilled in the art that in the latter case, the same principles of relative positioning can be adopted when ensuring proper communication of the data and requests between the two different SLPs. Similarly, only presence of a single VRR service is assumed for the sake of simplicity. Nevertheless, there may be more than one VRR service, for instance one VRR service that provides data of a first VRR (for instance to be used for positioning a first UE) and further, different VRR service that provides data of a second VRR (for instance to be used for positioning a second UE).

In FIGS. 7a-7k, the following notation is used: Solid lines between components indicate transfer of measurement data, assistance data or data of VRRs (which data may then for instance be transformed into assistance data by the SLP). Therein, the terms "assistance" data and "measurement" data may for instance be differentiated as follows: Assistance may for instance be understood as something that helps a UE to calculate its position. Non-limiting examples are satellite orbit/clock models. Measurements may for instance be understood as measurements made by a UE to calculate a position. Assistance and measurements together may for instance allow for position determination. Note that typically assistance may come from a server, and measurements may come from a UE. Thus, in case of VRR-based positioning of a UE, the UE makes measurements, and receives (reference measurement) assistance related to a VRR from the server. These measurements and assistance then allow the UE to calculate its position accurately.

Examples of measurement data are thus carrier and/or code phase measurements of UEs, and an example of assistance data (for instance provided in the LPP context) is data comprising carrier and/or code phase measurements of UEs or VRRs and optionally further information (such as a position of a UE or VRR).

Returning to the notation used in FIGS. 7a-7k, dashed lines indicate measurement requests (i.e. requests to provide measurement data), assistance requests (i.e. requests to provide assistance data) or positioning requests (i.e. requests to provide a (high-accuracy) position estimate, for instance based on relative positioning with respect to a VRR with known position), dash-dotted lines indicate transfer of determined positions, and dotted lines indicate associations of VRRs with UEs and the VRR service. Underlined components are components that perform determining an estimate of a relative position and thus have to have RPC. Furthermore, a star (*) indicates the component that initiates the RPM (for instance by sending a request to another component). A positioning in which the position estimate is determined by the UE is denoted as UE-based positioning, whereas a positioning in which a UE only provides requested measurements to another component (e.g. a server or another UE) that then determines the position estimate is denoted as UE-assisted positioning (with respect to the UE providing the measurements)).

Therein, FIGS. 7a-7c and FIG. 7i are directed to relative positioning without using any VRRs, and FIGS. 7d-h and 7j-7k are directed to relative positioning under exploitation of two VRRs (one for each UE/SET).

RPM-1:
According to FIG. 7a, an SLP initiates the relative positioning method (i.e. the determining of the estimate of the relative position/baseline between the UEs) by requesting continuous periodic measurements from the two UEs. The UEs provide according measurement data (e.g. carrier and/or code phase measurements, for instance as input to an RTK-based relative positioning) to the SLP. The two UEs are then understood to be driven in a UE-assisted mode, i.e. they only provide measurement data, but do not calculate the relative position themselves. The SLP then calculates the estimate of the baseline based on the measurements from the two UEs.

In this case, the relative position may have been requested from the SLP by an external location services client or by one of the UEs/SETs.

Periodic measurements (and similarly periodic assistance) may for instance be understood as measurements that are provided at certain intervals (for instance regular or irregular intervals).

In the context of carrier phase measurements, continuous periodic measurements (and similarly continuous periodic assistance) may for instance be understood in a way that the carrier phase is also tracked between measurement deliveries, so that the measurements are continuous from one measurement delivery to another, so that the measurements are not simply snapshot measurements. Such continuity may for instance be required in high-accuracy positioning, where multiple measurements may for instance be needed to fix and/or validate the integer ambiguities. Such continuity may also be required for continuous tracking of a baseline.

RPM-2:
According to FIG. 7b, the SUPL protocol is used create a data pipe between the two SETs. This data pipe (ULP-layer 605, see FIG. 6) is used to carry LPP messages between the two UEs.

In this scenario SLP only acts as a routing server for LPP messages.

The use of terms should be noted here. The term "SET" is used in the context of it being the termination point of the ULP. The term "UE" is then used in the context of the LPP as termination point of the LPP.

In this scenario, the UE1 initiates the relative positioning by requesting continuous periodic measurements from the UE2.

An interesting aspect in this relative positioning method is that in the LPP architecture (see 3GPP TS 36.355), only a "server" can send the request "LPP Request Location Information" to the UE. This message is used by a server, amongst other things, to request measurements from a UE. Hence, the UE1 in fact acts in a role of a "server", when requesting measurements from the UE2.

The UE1 then receives continuous periodic measurements from the UE2 (via the SLP), and the UE1 can calculate the estimate of the baseline between the two SETs.

RPM-3:
According to FIG. 7c, along the lines of RPM-2 (FIG. 7b) above, the UE1 does not request measurements from the UE2, but the UE1 requests the UE2 position at high QoS in accuracy sense (UE-based mode), for instance by the request "LPP Request Location Information". At the same time UE1 starts to push continuous periodic assistance (in the LPP context) to UE2 via the LPP without an explicit request from UE2. This periodic assistance includes the carrier and/or code phase measurements made by the UE1.

Now, because UE1 provides the reference measurement assistance to the UE2, the UE2 calculates its relative position with respect to the UE1 initially.

Then, because the UE2 shall return an absolute position in response to UE1's request, UE2 may for instance add the determined relative position (baseline) to the position of UE1, which may for instance have been provided to UE2 in the assistance pushed to UE2.

Now, when UE1 receives this UE2 position, it can subtract its own position, i.e. the UE1 position, from the received UE2 position to deduce the relative position (baseline) accurately. Therein, the position UE1 subtracts from the UE2 position corresponds (or at least substantially corresponds) to the position of UE1 provided to UE2 before. For instance, inter alia for this purpose, UE1 may store some of its historic locations. Each message may for instance contain a GNSS time stamp so that information, for instance on the position of UE1, can be matched by both UEs.

It should be noted that of the RPMs above, only RPM-1 is strictly according to the current version of the LPP specification (3GPP TS 36.355 V9.0.0). However, the SUPL specification does not (yet) support a continuous LPP session between the SLP and the UE. RPM-2 is technically possible, but requires that a UE can function in the roles of both a "target" and "server".

RPM-3 could be realized in the architectural sense. However, the necessary information elements (periodic assistance) are not (yet) available. Also RPM-3 requires UE1 to function in the role of the LPP "server" as UE1 a) requests a position estimate and b) provides assistance data to the UE2.

RPM-3 may for instance be preceded by a capability request so that UE1 knows that UE2 has RPC.

Figure 7A:
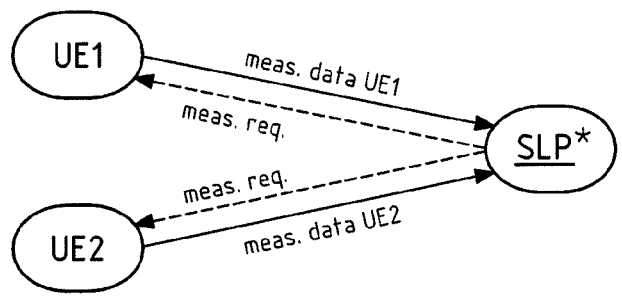
FIG. 7a: a schematic illustration of a first relative positioning method according to an embodiment of the present invention.
Figure 7B:
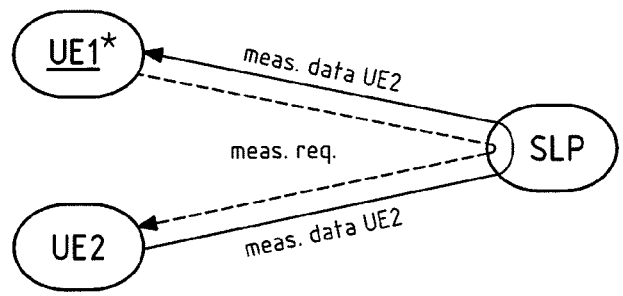
FIG. 7b: a schematic illustration of a second relative positioning method according to an embodiment of the present invention.
Figure 7C:
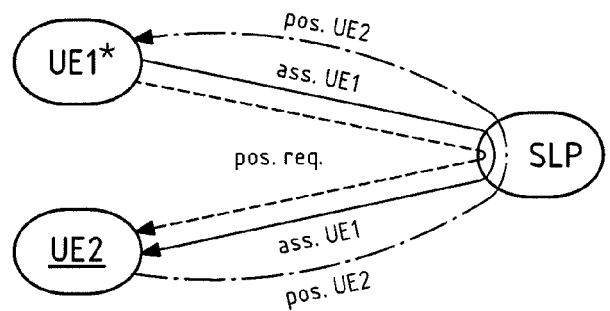
FIG. 7c: a schematic illustration of a third relative positioning method according to an embodiment of the present invention.
Figure 7D:
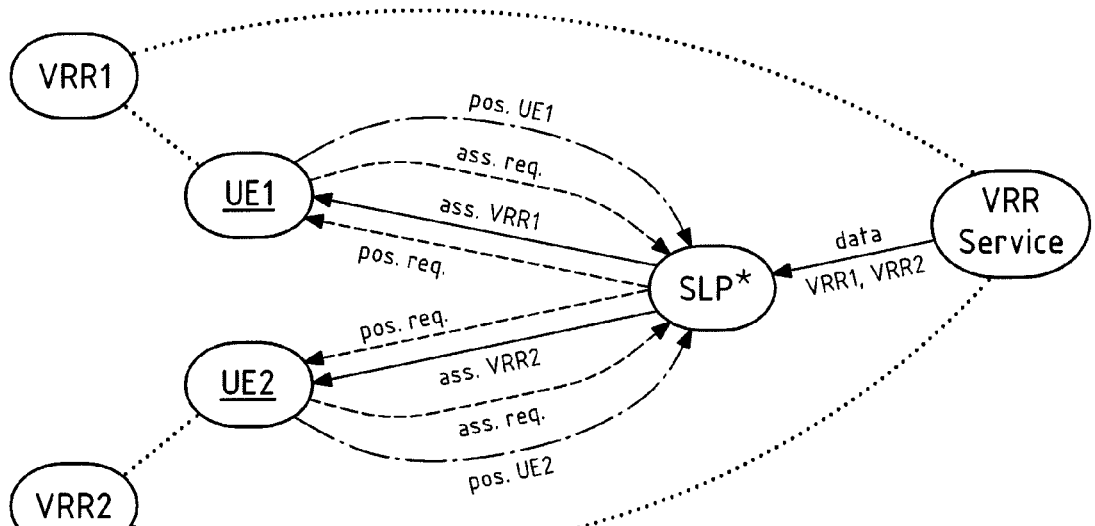
FIG. 7d: a schematic illustration of a fourth relative positioning method according to an embodiment of the present invention.

RPM-4:

According to FIG. 7d, the SLP initiates the relative positioning method by commanding the two UEs individually to perform UE-based positioning at high QoS in accuracy sense. The UEs position themselves relatively with respect to two VRRs (UE1 with respect to its associated VRR1 and UE2 with respect to its associated VRR2), and based on the knowledge of the absolute positions of the VRRs, the UEs are also capable of determining their absolute positions at high accuracy. In this case, the UEs request for continuous periodic reference measurement assistance from the SLP (for instance by the request "LPP Request Assistance Data"). In the end, the absolute positions of both UEs are known at high accuracy by the SLP, and the relative position of the SETs can be recovered (e.g. by subtracting these absolute positions).

In this case, the relative position may for instance have been requested by an external location services client or by one of the UEs/SETs from the SLP.

It should be noted that, when the UE requests for VRR reference measurements from the SLP, the coarse location (which may for instance be determined based on GNSS/AGNSS) of the UE may be needed and provided so that the VRR can be generated at the correct location. Alternatively, other position-related information, such as for instance the serving cell of the cellular network or the WLAN access point measurements may be provided by the UE. The SLP may then convert these measurements to a geographical area.

It should be noted that, as before, the UEs must have RPC in case of RPM-4. If there's no RPC in a UE (or both UEs), the UE (or both UEs) may for instance abort the session (because it cannot achieve the required accuracy) or may for instance return a conventional GNSS/AGNSS-based position.

Figure 7E:
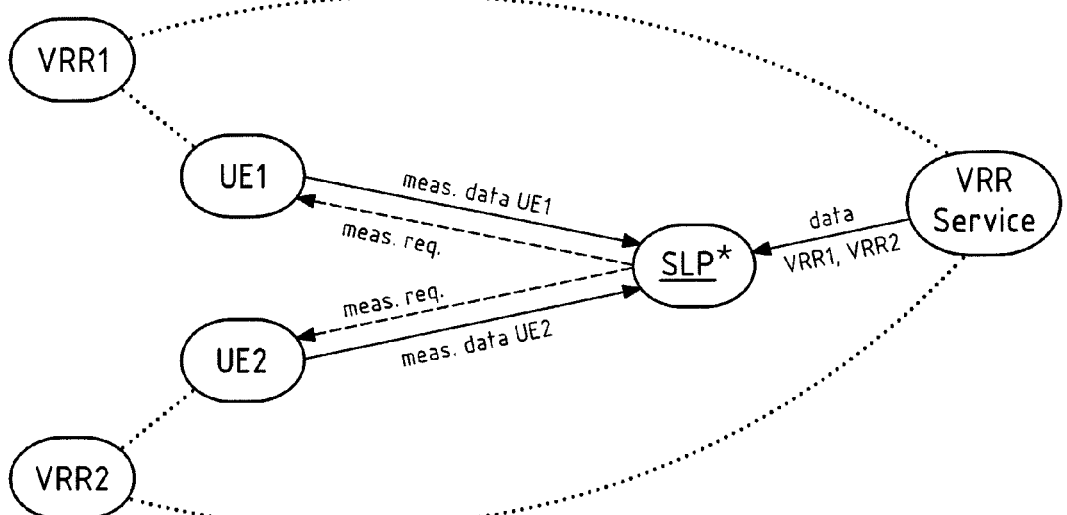
FIG. 7e: a schematic illustration of a fifth relative positioning method according to an embodiment of the present invention.

RPM-5:

According to FIG. 7e, the SLP initiates the relative positioning method by requesting continuous periodic measurements from the two SETs (UE-assisted). The SLP then positions the two SETs individually with respect to two VRRs.

In the end, the absolute location of the both UEs is known (based on knowledge on the absolute positions of the VRRs) at high accuracy by the SLP and the relative position of the SETs can be recovered (for instance by subtracting the absolute positions of the UEs).

Similarly to RPM-4, also in this case the relative position may have been requested from the SLP by an external location services client or by one of the UEs/SETs.

Figure 7F:
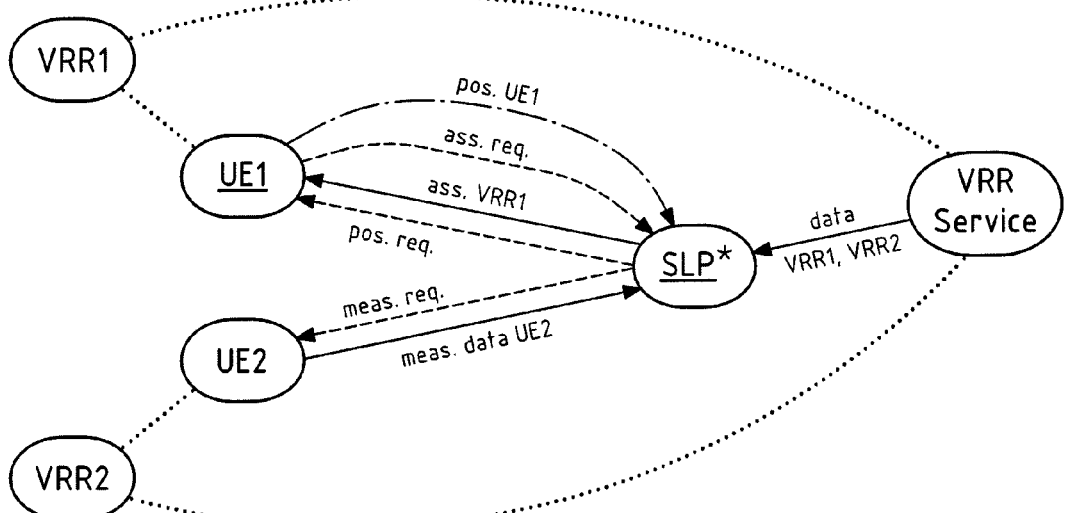
FIG. 7f: a schematic illustration of a sixth relative positioning method according to an embodiment of the present invention.

RPM-6:

According to FIG. 7f, RPM-6 is a combination of RPM-4 and RPM-5 in a way that one UE is positioned in the UE-based mode and the other UE in the UE-assisted mode. The SLP initiates the relative positioning method by requesting a high-accuracy position from UE1 (UE-based), which positions itself with respect to VRR1 and returns a high-accuracy absolute position to the SLP, and by requesting measurement data from UE2 (UE-assisted), based on which (and on further measurement data for VRR2) the SLP then determines the relative position between UE2 and VRR2 and then also the absolute position of UE2. Based on the absolute positions of UE1 and UE2, the SLP then determines the relative position between the UEs.

Also in this case, the relative position may have been requested from the SLP by an external location services client or by one of the UEs/SETs.

Therein, it may be necessary that the SLP is aware that UE1 has RPC.

Figure 7G:
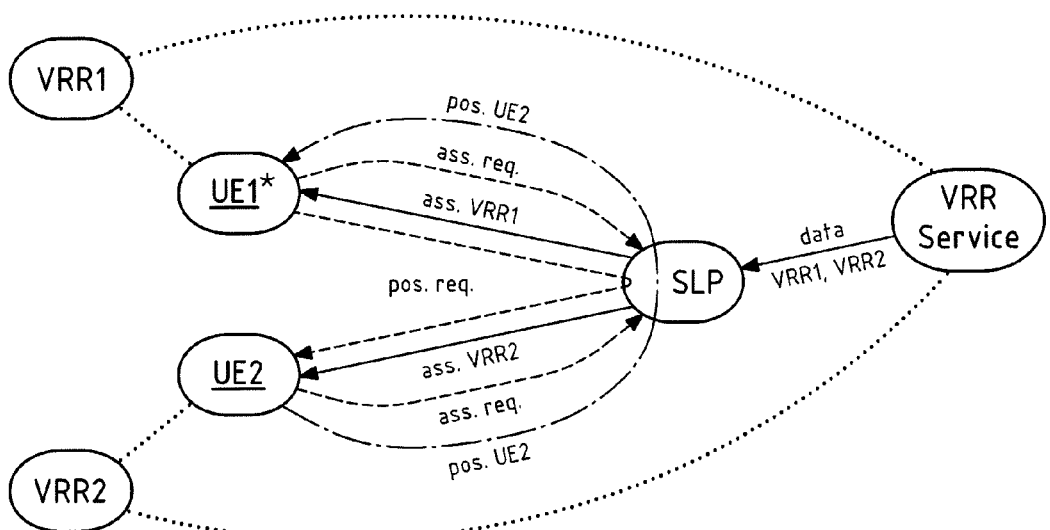
FIG. 7g: a schematic illustration of a first variant of a seventh relative positioning method according to an embodiment of the present invention.

RPM-7-4:

According to FIG. 7g, RPM-7-4 is a modification of RPM-2 in a way that the (initiating) UE1 does not request continuous periodic measurements from the UE2, but requests a location estimate at high QoS in accuracy sense from UE2. In such circumstances, the UE2 would involve itself in a VRR-based positioning session, for instance UE-based as in RPM-4 (i.e. UE2 determines its absolute position), with the SLP. Also the UE1 would position itself in a similar manner. In the end, the UE1 would know both its own location and the location of the UE2 at high accuracy, and may then derive the relative position between both UEs.

Note that similarly to RPM-2, also here UE1 functions in the role of a "server", because it requests the position estimate from the UE2.

Figure 7H:
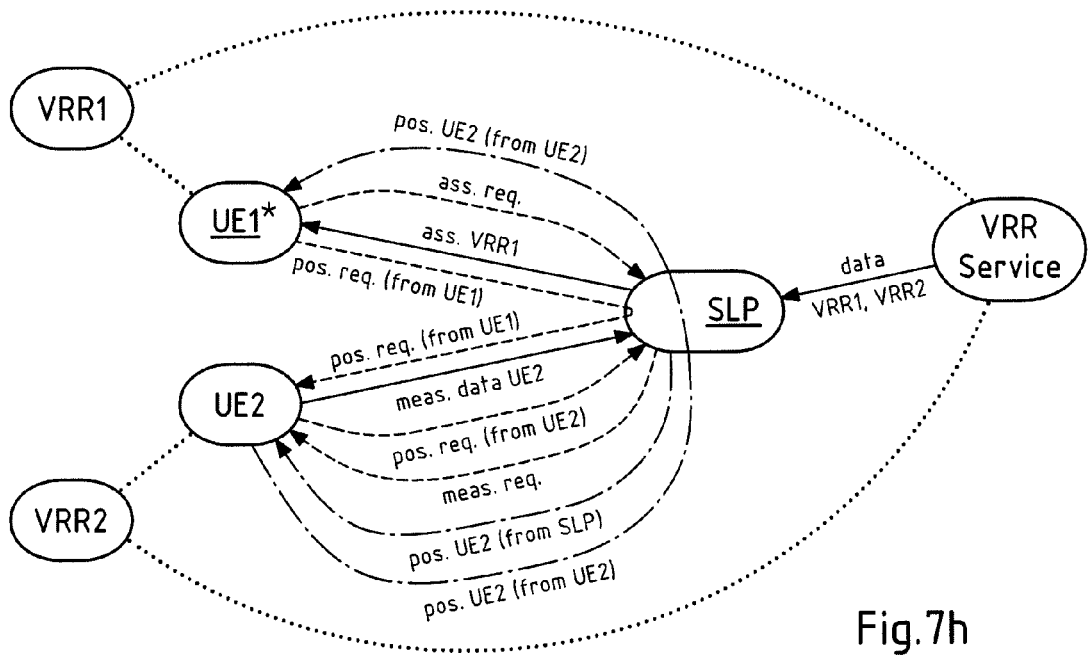
FIG. 7h: a schematic illustration of a second variant of a the seventh relative positioning method according to an embodiment of the present invention.

RPM-7-5:

According to FIG. 7h, RPM-7-5 is a modification of RPM-2 in a way that the (initiating) UE1 does not request continuous periodic measurements from the UE2, but requests a location estimate at high QoS in accuracy sense from UE2 (via the SLP). In such circumstances, the UE2 would involve itself in a VRR-based positioning session, for instance UE-assisted as in RPM-5, with the SLP (i.e. the SLP determines the absolute position of UE2).

This may for instance take the following shape: When UE2 receives the position request from UE1 (via the SLP) and UE2 deduces that it cannot calculate the position on its own (for instance due to lack of RPC), UE2 in fact sends a new position request to the SLP.

The SLP then requests measurements from UE2, calculates its position (based on these measurements and on measurement data of VRR2) and provides UE2 with its position, after which UE2 provides that position to the UE1 (via the SLP) as the response to the initial position request.

The UE1 would position itself as in RPM 7-4, i.e. it would request assistance from SLP, and the SLP would then provide UE1 with VRR1 assistance allowing UE1 to determine its absolute position.

In the end, the UE1 would know both its own location and the location of the UE2 at high accuracy, and may then derive the relative position between both UEs.

Note that similarly to RPM-2, also here UE1 functions in the role of a "server".

It is readily seen that RPM-7-5 differs from RPM-7-4 in the way the absolute position of UE2 is determined (UE2-based in RPM-7-4 and UE2-assisted in RPM-7-5).

Figure 7I:
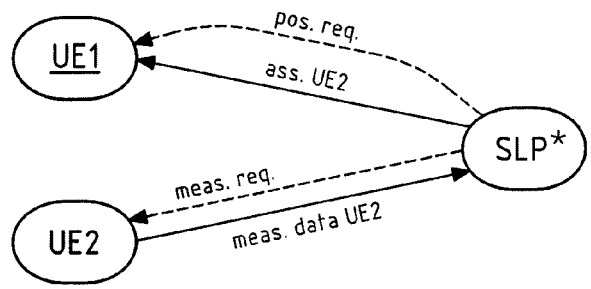
FIG. 7i: a schematic illustration of an eighth relative positioning method according to an embodiment of the present invention.

RPM-8:

According to FIG. 7*i*, RPM-8 is a modification of RPM-6 in a way that the (initiating) SLP routes the measurements from the UE driven in UE-assisted mode (UE2 in FIG. 7*i*) to the UE driven in UE-based mode (UE1 in FIG. 7*i*) as assistance, i.e. the assistance the UE working in the UE-based mode receives does not originate from a VRR, but from the other UE. VRRs may thus be dispensed with in this RPM.

Also in this case the relative position may have been requested from the SLP by an external location services client or by one of the UEs/SETs.

Figure 7J:
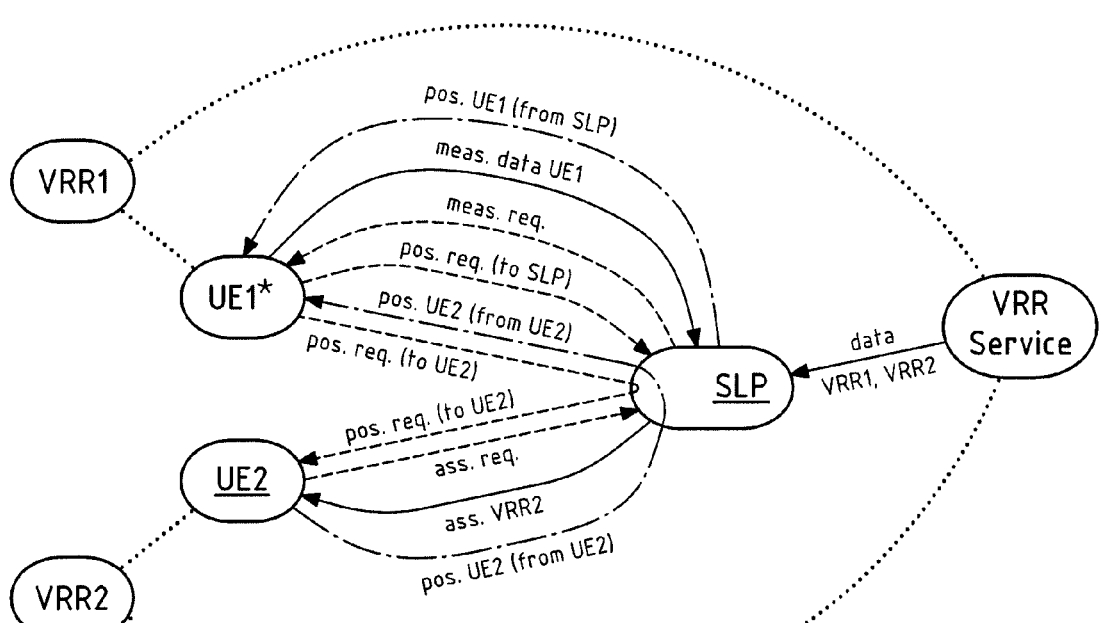
FIG. 7j: a schematic illustration of a first variant of a ninth relative positioning method according to an embodiment of the present invention.

RPM-9-4:

According to FIG. 7*j*, UE1 does not have RPC, but the SLP has RPC and there's also a VRR service at the SLP.

Furthermore, the UE2 has RPC and thus can be positioned in UE-based mode at high accuracy.

Now, UE1 initiates the RPM by requesting the position of UE2 at high accuracy from the UE2 (via the SLP). The UE2 then engages itself in a positioning session with its SLP in UE-based fashion, as already explained for UE2 in RPM-4 and RPM-7-4 (i.e. by requesting assistance from the SLP). At some point, UE2 then returns its absolute position with high-accuracy to UE1 (via the SLP).

UE1 further requests its position from the SLP. Because UE1 does not have RPC, UE1 is driven in UE-assisted mode, i.e. a position request is sent to the SLP, which in turn sends a measurement request to UE1. UE1 then provides measurement data to the SLP, which, further based on measurement data of VRR1, determines the absolute position of UE1 and returns it to UE1.

Finally, UE1 has its own and the UE2 positions at high accuracy and can deduce the baseline.

Note that similarly to RPM-2, also here UE1 functions in the role of a "server".

Figure 7K:
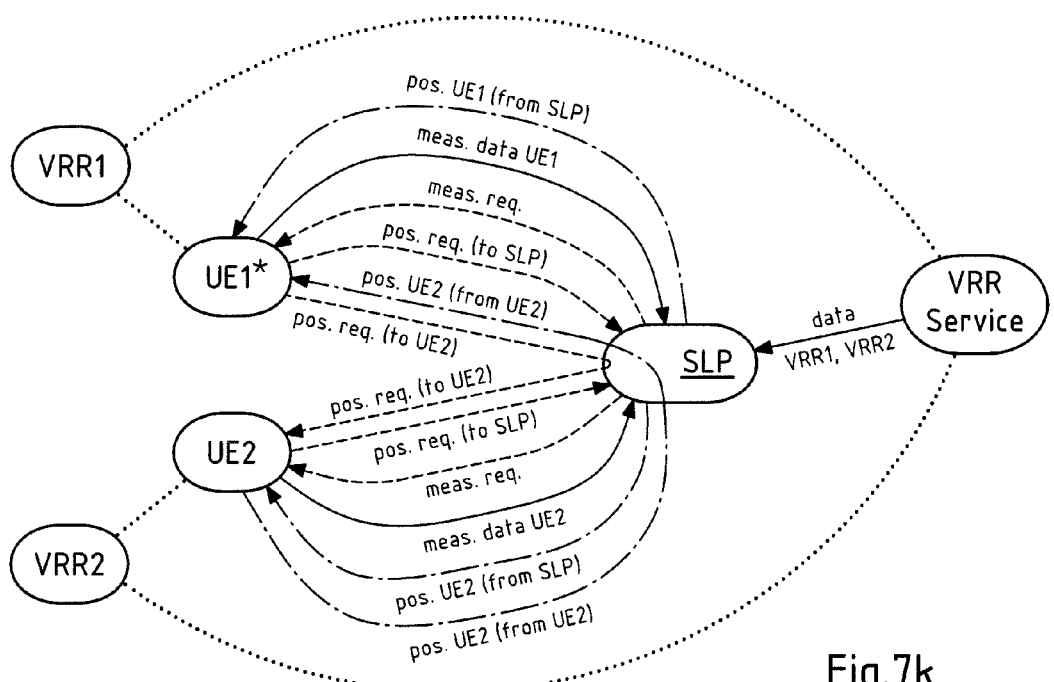
FIG. 7k: a schematic illustration of a second variant of the ninth relative positioning method according to an embodiment of the present invention.

RPM-9-5:

According to FIG. 7*k*, similar to RPM-9-4 of FIG. 7*j*, UE1 does not have RPC, but the SLP has RPC and there's also a VRR service at the SLP.

However, now UE2 has no RPC and thus can only be positioned in UE-assisted mode at high accuracy.

UE1 initiates the RPM by requesting the position of UE2 at high accuracy from the UE2 (via the SLP). The UE2 then engages itself in a positioning session with its SLP in UE-assisted fashion, as already explained for UE2 in RPM-7-5 (i.e. by requesting its position at high accuracy from the SLP, which then in turn requests measurements from UE2, determines the position of UE2 based on measurement data from UE2 and of VRR2 and returns this position to UE2). UE2 then returns its absolute position with high-accuracy to UE1 (via the SLP).

As in RPM-9-4, UE1 further requests its position from the SLP. Because UE1 does not have RPC, UE1 is driven in UE-assisted mode, i.e. a position request is sent to the SLP, which in turn sends a measurement request to UE1. UE1 then provides measurement data to the SLP, which, further based on measurement data of VRR1, determines the absolute position of UE1 and returns it to UE1.

Finally, UE1 has its own and the UE2 positions at high accuracy and can deduce the baseline.

Note that similarly to RPM-2, also here UE1 functions in the role of a "server", when it requests position from the UE2. However, when the UE1 requests its position from the SLP, the UE1 functions in the role of the "target" in the LPP architecture sense. Hence, UE1 is in fact taking a dual-role here.

With respect to the example RPMs described above, it should be noted that the server via which a UE receives, say, a position request may be different from a server from which the UE then requests assistance data. For instance, in case RPM-7-4, UE2 receives a position request from UE1 via a server, which, in FIG. 7*g*, for the sake of simplicity of presentation, was assumed to coincide with the server that functions as SLP. The former server may however only be a "dumb" relay server. The assistance data server to which UE2 connects to retrieve assistance data may then be another server.

Furthermore, in the example RPMs described above, a server that only relays LPP messages (as for instance in RPM-2) can well be any general server, i.e. it need not necessarily be a dedicated positioning or assistance server, like an SLP. In such cases, for instance a point-to-point connection between the two entities may also be feasible.

Furthermore, in the example RPMs described above, it is to be noted that not all messaging necessarily needs to take place within the same protocol. In fact, when considering SUPL and LPP, for instance in cases where an SLP requests a position from a UE, the request/provision may be in the LPP protocol layer, and in cases where a UE requests its position from an SLP, the request/response may be in the SUPL's ULP layer.

RPM-5 is implementable with the current version of the LPP specification (3GPP TS 36.355 V9.0.0). RPM-4 is realizable in the architectural sense, but the required periodic assistance is not (yet) part of LPP specification. Moreover, SUPL does not (yet) support continuous LPP sessions.

RPM-1, RPM-2, RPM-3 and RPM-8 involve directly combining the measurements/assistance from the two entities (UE1 and UE2) to calculate the estimate of the baseline. Especially, when the receivers are single-frequency GNSS receivers, the baseline lengths are preferably limited to short ones, because of the requirement to have atmospheric coherence, for instance so that common mode errors cancel as described above. With multi-frequency GNSS receivers, longer baselines may be allowed—in practice for instance baseline lengths up to 50 km are achievable in good conditions.

Having the VRRs in the architecture, as in RPM-4, RPM-5, RPM-6, RPM-7-4, RPM-7-5, RPM-9-4 and RPM-9-5 obviously allows for having an arbitrarily long baseline (this of course being understood in the limits of the VRR availability area, which may for instance coincide with the area of the GNSS reference receiver network used to generate the VRRs), because the two UEs can be positioned independent of each other with respect to two VRRs. One of these VRRs (VRR1) is generated at location of one UE (UE1), and the other VRR (VRR2) is generated at the location of the other UE (UE2). In the end, the absolute locations of the two UEs are known at high accuracy (if the absolute positions of the two VRRs are known). Thus also the baseline between the UEs is known accurately.

From the architecture perspective, the "lightest" (simplest) RPM is not to have the VRR Service in the architecture (RPM-1, RPM-2, RPM-3 and RPM-8). However, this may limit the baseline lengths to a few kilometers (for instance a few kilometers (e.g. below 5 or 10 kilometers) in the single-frequency GNSS receiver case, and tens of kilometers (e.g. below 30 or 50 kilometers) in the dual-frequency GNSS receiver case). In contrast, if there is an VRR Service available at the SLP, an arbitrary length baseline is possible, because the SETs are positioned individually with respect to VRRs.

From the performance perspective, an RPM in which the SLP only acts to relay LPP messages or to instruct and initiate the position session appears favourable. This means RPM-2, RPM-3, RPM-4, RPM-7-4 and RPM-8. Therein, RPM-2, RPM-3 and RPM-8 are lightest of these, because the SLP only forwards LPP messages (and to map measurement data into assistance data in case of RPM-8). In RPM-4 and RPM-7-4, the SLP needs to be actively involved via the VRR generation. However, all these methods require at least one of the UEs to have RPC, i.e. to have a calculation engine for relative positioning.

Finally, RPM-1, RPM-5 and RPM-9-5 are quite heavy for the SLP, because the SLP is involved in the position calculation for both UEs. On the other hand, RPM-1, RPM-5 and RPM-9-5 do not require the UEs to have any specific capabilities (in particular no RPC is required).

RPM-6, RPM-7-5 and RPM-9-4 are somewhere in the middle in terms of performance requirements.

The following tables summarize the various choices depending upon the availability of a VRR Service at the SLP, the baseline length/distance between the UEs, the RPC (e.g. RTK-type, requiring processing of continuous periodic measurements/assistance) of the UEs and the SLP, and the choice of UE-based or UE-assisted mode.

|  | Long baseline | Short baseline |
| --- | --- | --- |
| VRR Service available | x | x |
| No VRR Service available | — | x |

|  | RPC in SLP | No RPC in SLP |
| --- | --- | --- |
| RPC in UE | UE-based<br>UE-assisted | UE-based |
| No RPC in UE | UE-assisted | — |

The discussion of the different RPMs above shows the decisions involved in choosing the applicable RPM.

Therein, for instance the distance between the two UEs/SETs (corresponding to entities 1 and 2 of FIGS. 1a and 1b) may affect the selection of the RPM (or if a fallback solution, such as for instance a difference between two GNSS estimates or two AGNSS estimates of the two UEs has to be used, as indicated by the "-" sign in the first table above).

Moreover, the discussion also shows how the RPCs of the UEs and/or SLP (server entity 3/3') and/or the availability of a VRR service (reference service) at the SLP may affect the selection (see the second table above).

Therefore, the present invention inter alia discloses a selection of an RPM from a set of different RPMs under consideration of one or more of these criteria.

According to an embodiment of the present invention, the selection of the RPM may for instance take the following shape (see step 402 of flowchart 400 of FIG. 4), in case the UE initiates the relative positioning session directly with the other UE, i.e. RPM-2, RPM-3, RPM-7-4, RPM-7-5, RPM-9-4 and RPM-9-5 above:

A preferred mode may be to perform relative positioning between the UEs without the SLP interfering in the positioning process and only relaying LPP messages between the two UEs. Hence, the UE1 may first have to request the coarse location of the UE2 so that the UE1 may decide, if direct relative positioning can be made as in RPM-2. The coarse location may for instance be obtained quickly based on the Enhanced Cell Identification (ECID, see for instance 3GPP TS 36.305) (i.e. the identification of the cell of the cellular communication system the UE is currently located in, which cell gives a rough position estimate) or on conventional GNSS or AGNSS.

In case the distance between the two terminals is short, the UE1 may request continuous periodic measurements from the UE2 in order to deduce the estimate of the baseline. This is the most cost effective choice in terms of overall system resources. In this case, UE2 does not need to have RPC, because the UE2 is only making standard measurements, and the burden of calculation is on the UE1.

In case the distance between the two terminals is longer than the threshold length, the UE1 may resort to RPM-7-4, RPM-7-5, RPM-9-4 and RPM-9-5. However, in case the SLP serving the UE1 and/or UE2 has no VRR service, the relative position cannot be deduced at high accuracy. Hence, the VRR service availability should be carried as part of the capabilities transfer between the applicable parties (and in the applicable direction, i.e. from the server to the UE). The relative positioning may then resort to a fallback solution, for instance to the difference of conventional AGNSS-based position estimates having an accuracy of tens of meters.

In case the SLP serving UE1 and UE2 (note: UEs may be served by the same SLP or by two different SLPs) have VRR service availability, then the RPM selection depends on the SLP and UE RPCs according to the second table above. Even in this case it might happen that the relative positioning is not possible—this happens in case neither the UE nor SLP are capable of relative positioning (i.e. the availability of VRR does not guarantee the RPC in the SLP). Thus also the relative positioning capabilities should be carried between the applicable parties (and in the applicable direction).

The scenario above is an example of how the distance between the two UEs affects the RPM selection process. Also shown is how the RPM selection process is affected by the capabilities of the SLP, UE1 and UE2.

FIG. 8 is a flowchart 800 of an embodiment of a method for selecting an RPM according to an embodiment of the present invention, where the RPM is initiated by a UE (for instance UE1 of FIG. 7b, 7c, 7g or 7h). This flowchart partially reflects the rules described above. It should be noted that the root decision of the flowchart in step 801, whether the distance between the UEs is short or not, is only exemplary. Equally well, at the root of the flowchart 800, another decision, for instance related to the service availability at an SLP, or related to the RPC of one of the components, could be placed, depending on the optimization criterion (e.g. low complexity for the SLP or the UEs, simple architecture, specification conformity, etc.) targeted by the selection process.

In step 801, it is checked if the estimated/measured (coarse) distance between the UEs is short, for instance by comparing it against a pre-defined threshold (which may for instance be 10 km). Alternatively, this threshold may be selected from a set of at least two different pre-defined thresholds, or it may be adaptable. For instance, the threshold may be determined or selected at least partially based on a capability of one or both UEs to measure signals to be used in the RPM, such as for instance different GNSS signals (e.g. GPS L1C/A and L2C signals). Step 801 may then for instance comprise a checking of the capabilities of the UEs to measure such signals.

For instance, in cases where a VRR service can provide dual-frequency measurements, but where a UE to be positioned with respect to a VRR can only measure a single frequency, relative positioning may only take place with that single common frequency.

For instance, in RPM-5, the SLP might first request the UE1 and UE2 capabilities to find out the set of common signals that both UEs are capable of measuring. For example, it might be that UE1 supports the GPS L1C/A and L2C signals, but that UE2 only supports the GPS L1C/A signal. Hence, relative positioning may only be performed using the L1C/A signal (as the common signal). Because of only one frequency being available for relative positioning (single-frequency case), UE1 and UE2 have to be required to be closer to each other (e.g. below 5 or 10 kilometers as stated above) as compared to the dual-frequency case, when an RPM without use of a VRR service shall be used (such as for instance RPM-1).

If step 801 yields a positive result, it is checked in step 802 if UE1 has RPC. If this is the case, RPM-2 is selected (step 803). Otherwise, it is checked if UE2 has RPC (step 804). If this is the case, RPM-3 is selected (step 805). Otherwise an AGNSS-based fallback solution (e.g. forming the difference between the absolute positions of the UEs obtained via conventional AGNSS) is performed (step 806).

If step 801 reveals that the distance cannot be considered short, it has to be checked if VRR-based RPM can be performed.

In a step 807, it is checked if a VRR service is available at the SLP(s) of UE1 and UE2. If this is not the case, only the fallback solution of step 806 is possible. Otherwise, it is checked if UE1 has RPC (step 808).

If this is the case, it is checked in step 809 if UE2 has RPC.

If this is the case, RPM 7-4 is selected (step 810). Otherwise, it can still be checked if the SLP of UE2 has RPC (step 811).

If this is not the case, again only the fallback solution of step 806 is possible. Otherwise, RPM 7-5 is selected (step 812).

If step 808 yields false, it is checked in step 813 if the SLP of UE1 has RPC. If this is not the case, only the fallback solution of step 806 is possible. Otherwise, it is checked in step 814 if UE2 has RPC.

If this is the case, RPM-9-4 can be selected (step 817). Otherwise, it has to be checked if the SLP of UE2 has RPC (step 815).

If this is the case, RPM-9-5 can be selected. Otherwise, only the fallback solution of step 806 is possible.

In the following, the case that the SLP (or one of the SLPs associated with the two UEs) initiates the RPM will be considered, basically allowing selecting RPM-1, RPM-4. RPM-5, RPM-6 and RPM-8.

According to an embodiment of the present invention, the selection of the RPM may also take the following shape (see step 402 of flowchart 400 of FIG. 4), in case that the SLP (or one of the SLPs associated with the two UEs) initiates the RPM (basically allowing selecting RPM-1, RPM-4, RPM-5, RPM-6 and RPM-8):

If the SLP wants to get away easy (i.e. with low complexity involved for him), the SLP might select RPM-8.

However, this may require that the SLP knows that the distance between the UEs does not exceed a threshold and that one of the UEs has RPC. Thus, the decision may have to be preceded by the measurement/estimation of the coarse distance between UE1 and UE2 as well as by the requesting of the UE capabilities in order to find out their RPCs.

If RPM-8 is not possible (for example, because the SLP does not support such functionality), another preferable option for the SLP may be not to engage in the positioning itself, but just to relay assistance to the UEs. This means that the SLP may prefer UE-based methods, in which the SLP provides the UEs continuous periodic VRR assistance according to RPM-4 above. In such a case, the distance between the UEs does not matter, because the UEs are positioned independently first with respect to VRRs.

Moreover, even if the UEs don't have RPC capability, the positioning with respect to the VRRs can also be made in the UE-assisted mode as described in RPM-5 (or as described in RPM-1, but only if the distance between the UEs is short). Also RPM-6 is possible, if at least one of the UEs has RPC. Obviously, this assumes that also the SLP has RPC—otherwise the relative positioning fallbacks to the difference of conventional AGNSS-based position estimates, which may only have an accuracy in the order of tens of meters.

In the circumstances that at the SLP serving the UEs, no VRR service is available, and/or the UEs do not have RPC, the SLP is forced to run the UEs in the UE-assisted mode (assuming the SLP has RPC) and calculate the relative position based on the received measurements. Under such circumstances, the SLP may have to 1) Request the coarse locations of the two UEs
2) In case the distance between the two terminals is short, the SLP can proceed with RPM-1 [or with RPM-8 in case one of the UEs has the relative positioning capability]. However, if SLP lacks the RPC (and RPM-8 wouldn't be possible), the relative positioning fallbacks to determining a difference of conventional AGNSS-based position estimates, which may have an accuracy of tens of meters only.
3) In case the baseline is longer than the threshold, the relative positioning then fallbacks to the difference of conventional AGNSS-based position estimates having an accuracy of tens of meters.

It should be noted that although (1) and (2) are presented separately here, it might also be the case that the SLP directly requests high-accuracy GNSS signal measurements (carrier phase) from the UEs. This measurement message from each UE might contain position information of the UEs. Therefore, step (1) might be included in (2) implicitly. Obviously, the choice whether to continue with, say, RPM-1 may then only take place after the measurement messages of both UEs have been received in this case.

Again the various scenarios above exemplify how for instance the distance between the two UEs may guide the RPM selection process. It is also shown how the RPM selection process is affected by the capabilities of the SLP, UE1 and UE2.

It should be noted that in case of a direct RPM, where an estimate of the baseline between the UEs is calculated by combining the measurements/assistance of UE1 and UE2 (without referring to measurement data from VRRs), it might be that the positioning fails for some reason. Then the relative position might fallback to the difference of the UE positions that are obtained from conventional AGNSS. As an alternative fallback mechanism, the SLP might first try to position the two UEs first with respect to individual VRRs. This might succeed, because the baseline lengths are short.

It should also be noted that in case that the direct RPM cannot be done/does not succeed and the SLP resorts to determining the UE positions using individual VRRs, both UE positions need to be determined accurately with respect to individual VRRs. In case only one UE is positioned accurately with respect to its VRR, the baseline cannot be deduced accurately.

Figure 9:
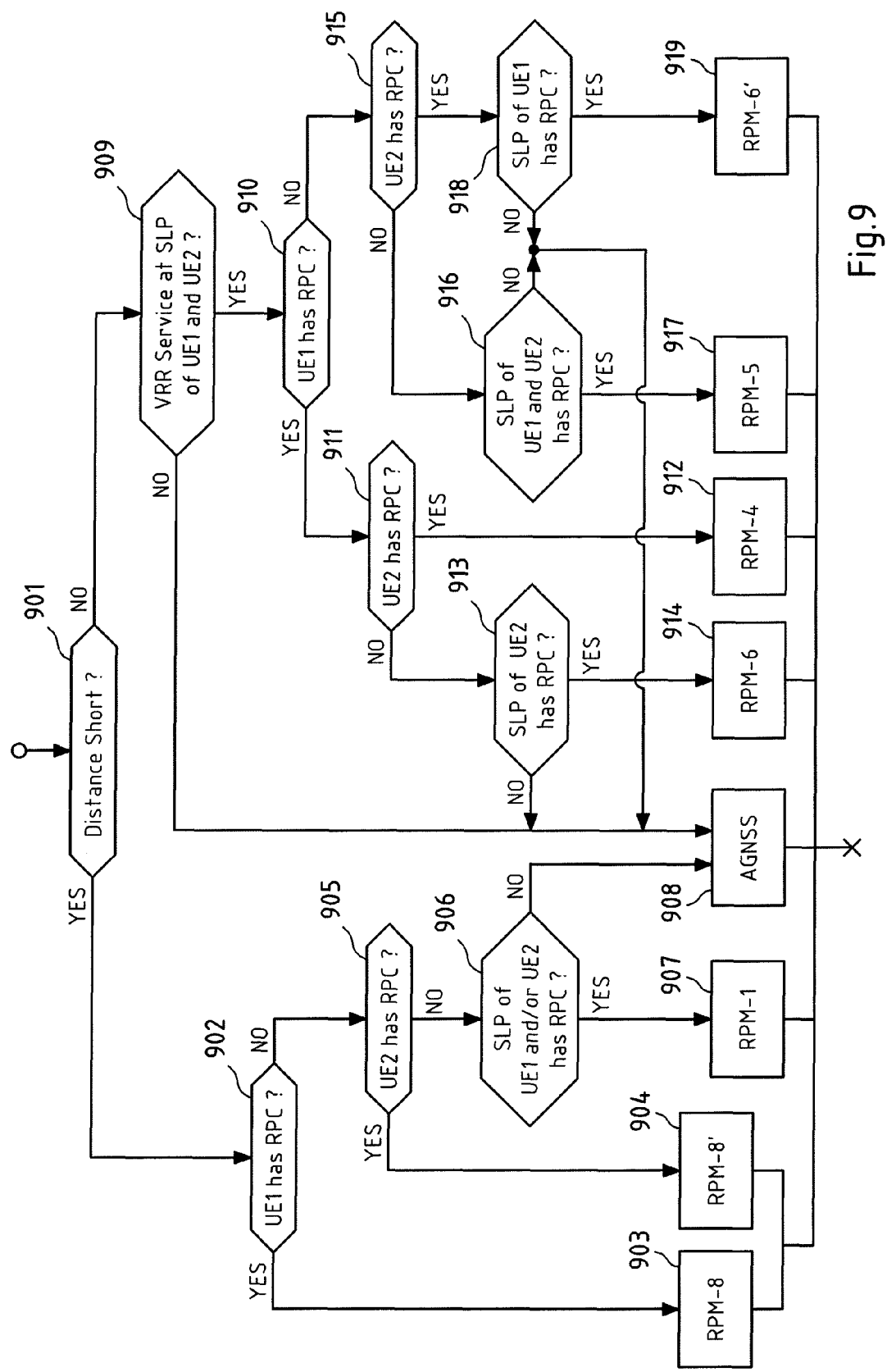
FIG. 9: a flowchart of a further embodiment of a method for selecting a relative positioning method according to an embodiment of the present invention, where relative positioning is initiated by a Secure User Plane Protocol Location Platform (SLP).

FIG. 9 is a flowchart 900 of an embodiment of a method for selecting an RPM according to an embodiment of the present invention, where the RPM is initiated by one of the SLPs associated with the UEs (therein, both UEs may of course also be associated with the same SLP). This flowchart partially reflects the selection rules described above. It should however be noted that the root decision of the flowchart in step 901, whether the distance between the UEs is short or not, is only exemplary. Equally well, at the root of the flowchart 900, another decision, for instance related to the service availability at an SLP, or related to the RPC of one of the components, could be placed, depending on the optimization criterion (e.g. low complexity for the SLP or the UEs, simple architecture, specification conformity, etc.) targeted by the selection process.

In a first step 901, the distance between the two UEs is determined (for instance coarsely estimated or measured based on GNSS or AGNSS, or on a cell ID as already described above). If the distance is considered "short" (for instance below a pre-defined threshold, e.g. 10 km), it is checked in a step 902 if UE1 has RPC. If this is the case, RPM-8 is selected (step 903). Otherwise, it is checked in step 905 if UE2 has RPC.

If this is the case, RPM-8' is selected (which is a modification of RPM-8, where UE1 and UE2 change their roles). Otherwise, it is checked if the SLP of UE1 and/or the SLP of UE2 has RPC (step 906).

If this is the case, RPM-1 is performed. Therein, if only one of the SLPs has RPC, the determining of the estimate of the relative position is performed in the SLP having RPC. If both SLPs have RPC, the determining is either performed in both of them or only in one of them. If both SLPs have RPC, for instance one of them may initiate the RPM, and then for instance this SLP initiating the RPM may also be the one that performs the determining. Otherwise, an AGNSS-based fallback solution (corresponding to step 806 of flowchart 800 of FIG. 8) is performed (step 908).

If the check in step 901 reveals that the distance is large, it is checked if a VRR-assisted RPM can be selected.

To this end, it is first checked in step 909 if a VRR service is available at the SLP of UE1 and the SLP of UE2 (these SLPs may also be only a single common SLP for both UE1 and UE2).

If this is not the case, the fallback solution of step 908 has to be selected. Otherwise, it is checked in step 910 if UE1 has RPC.

If this is the case, it is further checked if UE2 has RPC (step 911).

If this is the case, RPM-4 is selected. Otherwise, it is checked in step 913 if the SLP of UE2 has RPC.

If this is not the case, the fallback solution of step 908 has to be selected. Otherwise, RPM-6 is selected (step 914).

If the check in step 910 reveals that UE1 has no RPC, it is checked in step 915 if UE2 has RPC. If this is the case, it is checked in step 918 if the SLP of UE1 has RPC.

If this is the case, RPM-6' is selected, which is a modification of RPM-6 in which the two UEs change their roles. Otherwise, only the fallback solution of step 908 is possible.

If the check in step 915 reveals that UE2 has no RPC, it is checked in step 916 if the SLPs of UE1 and UE2 (which may be the same common SLP) have RPC. If this is the case, RPM-5 is chosen. Otherwise, again only the fallback solution of step 908 can be resorted to.

In the embodiments of the present invention presented so far, the case of determining an estimate of a relative position (baseline) between only two entities (a first entity and a second entity) has been focussed upon. Nevertheless, of course also the determining of estimates of baselines between multiple (more than two) entities (e.g. a first entity, a second entity and a third entity that are positioned with respect to each other) is within the scope of the present invention. Then for instance baselines between the first and second entity, between the first and third entity, and between the second and third entity may be estimated. Basically the same RPMs and selection rules can be applied there.

However, it may for instance be the case that a subset of these multiple entities doesn't need reference entities (e.g. VRRs), but some do, because they are further away.

For instance, in case of four UEs (as examples for entities), it might happen that all four are close to each other and they can be positioned with respect to each other (by determining their respective baselines) as in RPM-1. Or all are far away from each other leading to RPM-4 individually, RPM-5 individually or RPM-6 individually (i.e. either UE-assisted/based), to name but a few examples.

It might also happen that three of them are close to each other and could be positioned as in RPM-1. However, one of them may be further away. Now, it may be suboptimum to position the three with respect to each other with RPM-1 and the fourth with respect to a VRR, because the baseline between the set of three UEs and the fourth UE could not be captured accurately.

Thus, it might then be advantageous that the SLP (associated with all four UEs) positions the three UEs that are close to each other with respect to a VRR1 (multi-baseline) and the fourth UE with respect to a VRR2. Having done this the relative positions of all the UEs are known at high accuracy, because the baseline between VRR1 and VRR2 is known at high accuracy.

To exemplify, regarding RPM-5 in FIG. 7e, UE1 could now in fact be considered to represent a set of three UEs, and UE2 would represent the fourth UE. The same analogy could for instance be applied to FIG. 7f as well.

It should be noted that the same selection rules (depending on distances, RPCs and VRR service availabilities) presented above play a role there.

Similarly, the position request by the UE1 could be carried to a multitude of UEs. Each of the UEs then may for instance position itself in a specific way (for instance in the manner shown in RPM-7-4, RPM-7-5, RPM-9-4 or RPM-9-5).

Furthermore, in the embodiments of the present invention presented so far, it has been described how measurements are requested from the UEs, how UEs provide measurements, how UEs request assistance from the SLPs and how SLPs provide assistance to the UEs.

Also the option has been described that the UE assumes the role of the "server" (see for instance the description of RPM-2, RPM-3, RPM-7-4, RPM-7-5, RPM-9-4 and RPM-9-5).

Now, also the case may be feasible that the UE1 somehow knows that the UE2 can act as a "server". The UE1 may then request "high accuracy GNSS reference measurement assistance" from the UE2 after which UE2 would start providing such assistance to the UE1. The assistance the UE2 would provide to the UE1 is (or comprises) the measurement data measured by the UE2. UE1 could have obtained the same data by requesting "measurements" also (from UE2 in UE2's role as a "target"). Nevertheless, this example simply shows that when mixing the "target" and "server" roles, all kinds of combinations are possible.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

The invention claimed is:

1. A method performed by an apparatus, said method comprising:
selecting a relative positioning method from a set of at least two different relative positioning methods that are for determining an estimate of a relative position between a first entity and a second entity, wherein said first entity and said second entity are mobile terminals of a mobile radio communications system, said relative positioning method selected in dependence on the following criterion:
a relative positioning capability, of at least one of said first entity, said second entity or at least one server entity associated with at least one of said first entity or said second entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite,
wherein in case that an estimated/determined distance between said first entity and said second entity is one of below and below-or-equal-to a threshold, a relative positioning method is selected in which said estimate of said relative position between said first entity and said second entity is determined based on data measured at said first entity and on data measured at said second entity without requiring any data of a reference entity.

2. The method according to claim 1, further comprising at least one of:
obtaining information on at least said criterion in dependence on which said relative positioning method is selected, or
initiating said selected relative positioning method.

3. The method according to claim 1, wherein communication between said first entity and its associated server entity and between said second entity and its associated server entity is at least partially based on at least one of the Secure User Plane Protocol or the Long Term Evolution Positioning Protocol.

4. A method performed by an apparatus, said method comprising:
selecting a relative positioning method from a set of at least two different relative positioning methods that are for determining an estimate of a relative position between a first entity and a second entity, wherein said first entity and said second entity are mobile terminals of a mobile radio communications system, said relative positioning method selected in dependence on the following criterion:
a relative positioning capability, of at least one of said first entity, said second entity or at least one server entity associated with at least one of said first entity or said second entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite,
wherein in case that an estimated/determined distance between said first entity and said second entity is above a threshold, a relative positioning method is selected that is based on measurements performed by said first entity and said second entity and also on data of at least two reference entities.

5. A method performed by an apparatus, said method comprising:
selecting a relative positioning method from a set of at least two different relative positioning methods that are for determining an estimate of a relative position between a first entity and a second entity, wherein said first entity and said second entity are mobile terminals of a mobile radio communications system, said relative positioning method selected in dependence on the following criterion:
a relative positioning capability, of at least one of said first entity, said second entity or at least one server entity associated with at least one of said first entity or said second entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite, wherein said relative positioning method is further selected in dependence on the following criterion:

an availability, at at least one of said at least one server entity, of a service providing data of at least one reference entity useable for determining an estimate of a relative position between said reference entity and one of said first entity and said second entity, wherein in case that an estimated/determined distance between said first entity and said second entity is one of above and above-or-equal-to a threshold, a relative positioning method is selected in which said estimate of said relative position between said first entity and said second entity is determined based on data measured at said first entity, said second entity and at at least two reference entities.

6. The method according to claim 5, wherein in case that said service providing said data of said at least one reference entity is available at a common server entity associated with said first entity and said second entity or at both a first server entity associated with said first entity and a second server entity associated with said second entity and that at least one of said first entity, said second entity, said common server entity, said first server entity or said second server entity has said relative positioning capability, a positioning method is selected in which said estimate of said relative position between said first entity and said second entity is determined based on data measured at said first entity, said second entity and at at least two reference entities, and wherein said estimate of said relative position between said first entity and said second entity is determined based on an estimate of an absolute position of said first entity and an estimate of an absolute position of said second entity.

7. The method according to claim 6, wherein said estimate of said absolute position of said first entity is determined based on respective information on a respective absolute position of at least one of said at least two reference entities that is associated with said first entity and on a respective estimate of a respective relative position between said at least one reference entity associated with said first entity and said first entity, and wherein said estimate of said absolute position of said second entity is determined based on respective information on a respective absolute position of at least one of said at least two reference entities that is associated with said second entity and on a respective estimate of a respective relative position between said at least one reference entity associated with said second entity and said second entity.

8. The method according to claim 7, wherein in said selected relative positioning method, one of the following holds:

said respective estimate of said respective relative position between said at least one reference entity associated with said first entity and said first entity is determined by said first entity, and said respective estimate of said respective relative position between said at least one reference entity associated with said second entity and said second entity is determined by said second entity, said respective estimate of said respective relative position between said at least one reference entity associated with said first entity and said first entity is determined by a server entity associated with said first entity, and said respective estimate of said respective relative position between said at least one reference entity associated with said second entity and said second entity is determined by a server entity associated with said second entity, said respective estimate of said respective relative position between said at least one reference entity associated with said first entity and said first entity is determined by said first entity, and said respective estimate of said respective relative position between said at least one reference entity associated with said second entity and said second entity is determined by said server entity associated with said second entity.

9. The method according to claim 5, wherein said service providing data of at least one reference entity is a virtual reference receiver service providing data of at least one virtual reference receiver.

10. A non-transitory computer-readable medium having a computer program stored thereon, said computer program comprising:

program code for performing, when said computer program is executed on a processor, a method comprising:

selecting a relative positioning method from a set of at least two different relative positioning methods that are for determining an estimate of a relative position between a first entity and a second entity, wherein said first entity and said second entity are mobile terminals of a mobile radio communications system, said relative positioning method selected in dependence on the following criterion:

a relative positioning capability, of at least one of said first entity, said second entity or at least one server entity associated with at least one of said first entity or said second entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite, wherein in case that an estimated/determined distance between said first entity and said second entity is one of below and below-or-equal-to a threshold, a relative positioning method is selected in which said estimate of said relative position between said first entity and said second entity is determined based on data measured at said first entity and on data measured at said second entity without requiring any data of a reference entity.

11. An apparatus, comprising at least one processor; and at least one memory including computer program code, said at least one memory and said computer program code configured to, with said at least one processor, cause said apparatus at least to select a relative positioning method from a set of at least two different relative positioning methods that are for determining an estimate of a relative position between a first entity and a second entity, wherein said first entity and said second entity are mobile terminals of a mobile radio communications system, said relative positioning method selected in dependence on the following criterion:

a relative positioning capability, of at least one of said first entity, said second entity or at least one server entity associated with at least one of said first entity or said second entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite, wherein in case that an estimated/determined distance between said first entity and said second entity is one of below and below-or-equal-to a threshold, a relative positioning method is selected in which said estimate of said relative position between said first entity and said second entity is determined based on data measured at said first entity and on data measured at said second entity without requiring any data of a reference entity.

12. The apparatus according to claim 11, wherein said at least one memory and said computer program code are configured to, with said at least one processor, cause said apparatus further to at least one of obtain information on at least said criterion in dependence on which said relative positioning method is selected, or initiate said selected relative positioning method.

13. The apparatus according to claim 11, wherein communication between said first entity and its associated server entity and between said second entity and its associated server entity is at least partially based on at least one of the Secure User Plane Protocol or the Long Term Evolution Positioning Protocol.

14. The apparatus according to claim 11, wherein said apparatus is one of said first entity, said second entity and said at least one server entity, or a part thereof, and/or comprises a user interface.

15. An apparatus, comprising at least one processor; and at least one memory including computer program code, said at least one memory and said computer program code configured to, with said at least one processor, cause said apparatus at least to select a relative positioning method from a set of at least two different relative positioning methods that are for determining an estimate of a relative position between a first entity and a second entity, wherein said first entity and said second entity are mobile terminals of a mobile radio communications system, said relative positioning method selected in dependence on the following criterion:

a relative positioning capability, of at least one of said first entity, said second entity or at least one server entity associated with at least one of said first entity or said second entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite, wherein in case that an estimated/determined distance between said first entity and said second entity is above a threshold, a relative positioning method is selected that is based on measurements performed by said first entity and said second entity and also on data of at least two reference entities.

16. An apparatus, comprising at least one processor; and at least one memory including computer program code, said at least one memory and said computer program code configured to, with said at least one processor, cause said apparatus at least to select a relative positioning method from a set of at least two different relative positioning methods that are for determining an estimate of a relative position between a first entity and a second entity, wherein said first entity and said second entity are mobile terminals of a mobile radio communications system, said relative positioning method selected in dependence on the following criterion:

a relative positioning capability, of at least one of said first entity, said second entity or at least one server entity associated with at least one of said first entity or said second entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite, wherein said relative positioning method is further selected in dependence on the following criterion:

an availability, at at least one of said at least one server entity, of a service providing data of at least one reference entity useable for determining an estimate of a relative position between said reference entity and one of said first entity and said second entity, wherein in case that an estimated/determined distance between said first entity and said second entity is one of above and above-or-equal-to a threshold, a relative positioning method is selected in which said estimate of said relative position between said first entity and said second entity is determined based on data measured at said first entity, said second entity and at at least two reference entities.

17. The apparatus according to claim 16, wherein in case that said service providing said data of said at least one reference entity is available at a common server entity associated with said first entity and said second entity or at both a first server entity associated with said first entity and a second server entity associated with said second entity and that at least one of said first entity, said second entity, said common server entity, said first server entity or said second server entity has said relative positioning capability, a positioning method is selected in which said estimate of said relative position between said first entity and said second entity is determined based on data measured at said first entity, said second entity and at at least two reference entities, and wherein said estimate of said relative position between said first entity and said second entity is determined based on an estimate of an absolute position of said first entity and an estimate of an absolute position of said second entity.

18. The apparatus according to claim 17, wherein said estimate of said absolute position of said first entity is determined based on respective information on a respective absolute position of at least one of said at least two reference entities that is associated with said first entity and on a respective estimate of a respective relative position between said at least one reference entity associated with said first entity and said first entity, and wherein said estimate of said absolute position of said second entity is determined based on respective information on a respective absolute position of at least one of said at least two reference entities that is associated with said second entity and on a respective estimate of a respective relative position between said at least one reference entity associated with said second entity and said second entity.

19. The apparatus according to claim 18, wherein in said selected relative positioning method, one of the following holds:
- said respective estimate of said respective relative position between said at least one reference entity associated with said first entity and said first entity is determined by said first entity, and said respective estimate of said respective relative position between said at least one reference entity associated with said second entity and said second entity is determined by said second entity,
- said respective estimate of said respective relative position between said at least one reference entity associated with said first entity and said first entity is determined by a server entity associated with said first entity, and said respective estimate of said respective relative position between said at least one reference entity associated with said second entity and said second entity is determined by a server entity associated with said second entity,
- said respective estimate of said respective relative position between said at least one reference entity associated with said first entity and said first entity is determined by said first entity, and said respective estimate of said respective relative position between said at least one reference entity associated with said second entity and said second entity is determined by said server entity associated with second entity.

20. The apparatus according to claim 16, wherein said service providing data of at least one reference entity is a virtual reference receiver service providing data of at least one virtual reference receiver.

21. A system, comprising a first entity, a second entity and at least one server entity associated with at least one of said first entity or said second entity, wherein said first entity and said second entity are mobile terminals of a mobile radio communications system, wherein at least one of said first entity, said second entity or said at least one server entity is configured to select a relative positioning method from a set of at least two different relative positioning methods that are for determining an estimate of a relative position between said first entity and said second entity, said relative positioning method selected in dependence on the following criterion:
- a relative positioning capability, of at least one of said first entity, said second entity or said at least one server entity, to determine an estimate of a relative position between two entities, wherein said relative positioning capability is a capability to determine an estimate of a relative position between said two entities based on a double difference observable obtained by subtracting a first difference between respective data obtained for said two entities with respect to a first satellite of a Global Navigation Satellite System and a second difference between respective data obtained for said two entities with respect to a second satellite of said Global Navigation Satellite System that is different from said first satellite,
- wherein in case that an estimated/determined distance between said first entity and said second entity is one of below and below-or-equal-to a threshold, a relative positioning method is selected in which said estimate of said relative position between said first entity and said second entity is determined based on data measured at said first entity and on data measured at said second entity without requiring any data of a reference entity.

* * * * *